US012746757B2

(12) United States Patent
Nagai et al.

(10) Patent No.: US 12,746,757 B2
(45) Date of Patent: Sep. 29, 2026

(54) LIQUID DISCHARGE HEAD

(71) Applicant: CANON KABUSHIKI KAISHA, Tokyo (JP)

(72) Inventors: Noriyasu Nagai, Tokyo (JP); Naozumi Nabeshima, Tokyo (JP); Ryoji Inoue, Kanagawa (JP); Kyosuke Nagaoka, Tokyo (JP); Kazuya Yoshii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 18/760,479

(22) Filed: Jul. 1, 2024

(65) Prior Publication Data

US 2025/0018725 A1 Jan. 16, 2025

(30) Foreign Application Priority Data

Jul. 12, 2023 (JP) ................................ 2023-114629

(51) Int. Cl.
*B41J 2/175* (2006.01)
*B41J 2/18* (2006.01)

(52) U.S. Cl.
CPC ............ *B41J 2/17596* (2013.01); *B41J 2/18* (2013.01)

(58) Field of Classification Search
CPC ...... B41J 2/17596; B41J 2/18; B41J 2/17513; B41J 2/17556; B41J 2202/12; B41J 2/14024
USPC ........................... 347/17, 20, 21, 65, 85, 89
See application file for complete search history.

(56) References Cited

U.S. PATENT DOCUMENTS

2021/0394525 A1* 12/2021 Yamada .................... B41J 2/18
2023/0191795 A1 6/2023 Kondo et al.
2023/0191796 A1 6/2023 Ohara et al.
2023/0406000 A1 12/2023 Yabe et al.

FOREIGN PATENT DOCUMENTS

JP 2014-162084 A 9/2014

OTHER PUBLICATIONS

U.S. Appl. No. 18/638,290, Kazuya Yoshii Yushi Kitase Naozumi Nabeshima, filed Apr. 17, 2024.
U.S. Appl. No. 18/660,940, Manabu Ohara Koichi Kubo Kazuya Yoshii, filed May 10, 2024.
U.S. Appl. No. 18/754,786, Noriyasu Nagai Naozumi Nabeshima, filed Jun. 26, 2024.

* cited by examiner

*Primary Examiner* — Jannelle M Lebron
(74) *Attorney, Agent, or Firm* — Venable LLP

(57) ABSTRACT

A liquid discharge unit includes a discharge port which discharges liquid, a supply path which supplies the liquid to the discharge port, and a pressure control unit which controls a pressure of the liquid supplied from a liquid supply source to the supply path. The pressure control unit includes a fluid chamber having an inflow port of the liquid and an outflow port of the liquid, a valve body taking a closed position where the inflow port is closed and an open position where the inflow port is opened, a movable member taking a first position acting on the valve body such that the valve body is located at the closed position and a second position acting on the valve body, and an urging member which applies an urging force to the movable member.

9 Claims, 15 Drawing Sheets

LIQUID DISCHARGE HEAD

BACKGROUND OF THE INVENTION

Field of the Invention

An art of the present disclosure relates to a liquid discharge head which performs recording by an inkjet method.

Description of the Related Art

In a liquid discharge device, a discharge port of a recording element board (hereinafter, referred to simply as a "chip" in some cases) mounted on a liquid discharge head is open to atmospheric air, and ink used for the recording forms a meniscus by a capillary phenomenon at the discharge port. Here, a pressure applied to the ink at the discharge port is a negative pressure in general. As this negative-pressure generation source, there is a method of using a water head difference between a liquid level of an ink storage tank communicating with the discharge port and a liquid level of the discharge port, but the water head difference is changed in accordance with a positional change of the liquid level of the ink storage tank, and the negative pressure applied to the discharge port also fluctuates. Therefore, since a meniscus surface position in the discharge port fluctuates, a volume of a discharged droplet also fluctuates. When this fluctuation becomes larger, that is, by 3% or more, for example, there is a possibility that an image quality is influenced by generation of image density non-uniformity of the discharged ink.

Thus, for the purpose of stability of the meniscus surface position in the discharge port, as an art of controlling the negative pressure applied to the ink at the discharge port by using a pressure control unit, an art of using a valve lever in a pressure control mechanism is proposed as in Japanese Patent Application Publication No. 2014-162084.

For the purpose of realizing print with high image quality, ink containing a large quantity of solid parts such as pigments is used, and particularly white ink contains pigments such as titanium dioxide or the like which is precipitated and adheres easily. However, in the art in Japanese Patent Application Publication No. 2014-162084, a shaft of a valve and a seal surface of the valve are disposed perpendicularly to a gravity direction (horizontal direction).

In this case, when the aforementioned ink is used, there is a possibility that the ink adheres at an inflow port, which causes occurrence of a defective opening/closing operation of a valve lever, or a flow resistance by the ink flowing in through the inflow port is changed by the adhering ink, which affects fluctuation of the negative pressure in a negative pressure chamber. As a result, there is a possibility that the image quality of recording can deteriorate due to occurrence of image density non-uniformity of the ink or the like.

SUMMARY OF THE INVENTION

In view of the aforementioned problem, the art of this disclosure has an object to provide a liquid discharge head which can reduce adhesion of liquid or malfunction of a valve body at an inflow port of the liquid of a pressure control unit and maintain an image quality of records to which the liquid is discharged.

According to some embodiments, a liquid discharge unit includes a discharge port which discharges liquid; a supply path which supplies the liquid to the discharge port; and a pressure control unit which controls a pressure of the liquid supplied from a liquid supply source to the supply path. The pressure control unit includes a fluid chamber having an inflow port into which the liquid from the liquid supply source flows and an outflow port which causes the liquid having flowed in through the inflow port to flow out to the supply path; a valve body configured to be capable of taking a closed position where the inflow port is closed and an open position where the inflow port is opened; a movable member configured to be capable of taking a first position acting on the valve body such that the valve body is located at the closed position and a second position acting on the valve body such that the valve body is located at the open position in the fluid chamber; and an urging member which applies an urging force to the movable member for causing the movable member to be located at the first position. The movable member moves from the first position to the second position when a magnitude of a pressure in the fluid chamber becomes greater than the urging force of the urging member, and in a state where the liquid discharge unit is attached to a liquid discharge device which discharges the liquid to recording media by using the liquid discharge unit, a direction in which the liquid flows into the inflow port is a direction intersecting with a gravity direction.

Further features of the present invention will become apparent from the following description of exemplary embodiments with reference to the attached drawings.

DESCRIPTION OF THE EMBODIMENTS

Figure 1:
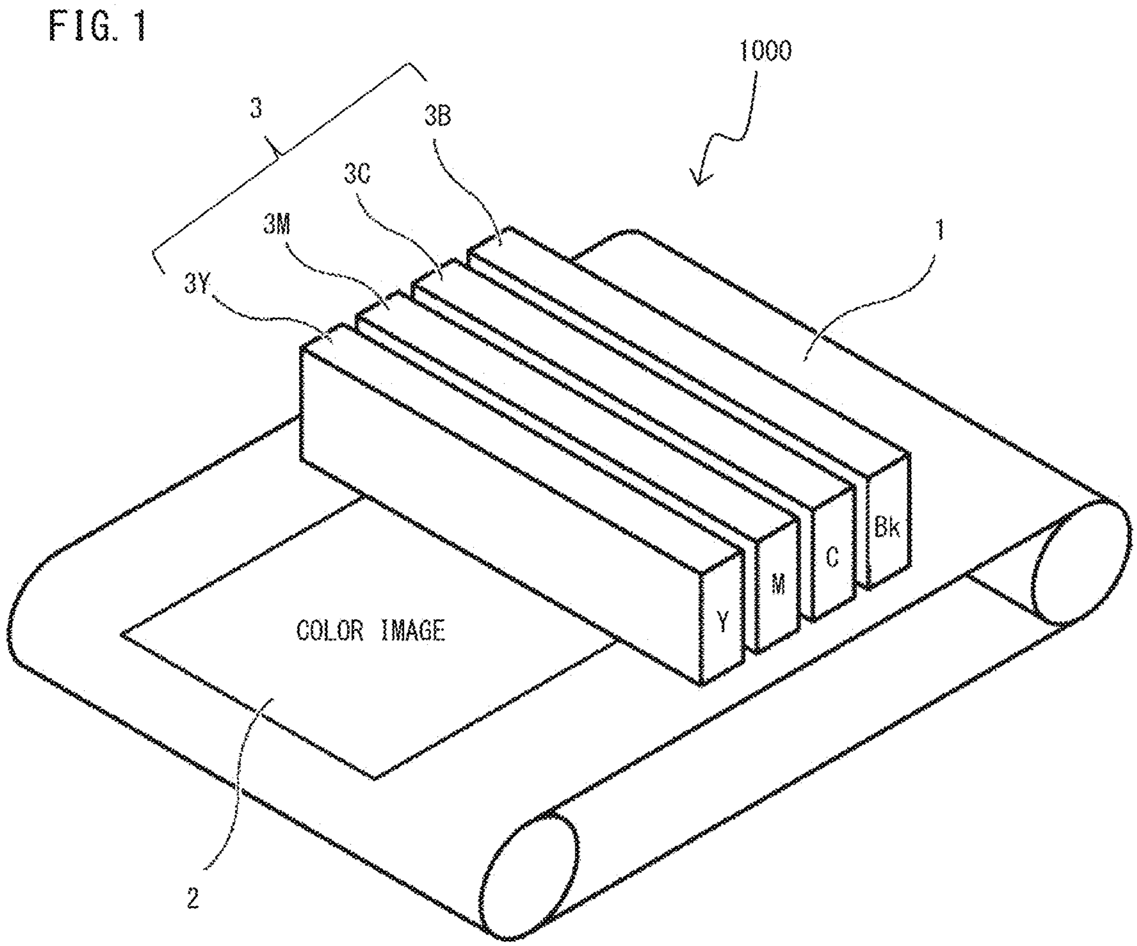
FIG. 1 is a schematic perspective view illustrating a liquid discharge device according to an Embodiment.

Hereinafter, Preferred Embodiments of the art of this disclosure will be explained in detail on the basis of the attached drawings. Note that, in each drawing, the same reference numerals are given to the same members, and duplicated explanation will be omitted. Hereinafter, each of Embodiments will be explained in more detail. Moreover, numerical values shown in each of Examples below are examples, and the art of this disclosure is not limited to them. Furthermore, the art of this disclosure is not limited to each of Embodiments but includes those further combining these Embodiments and those applied to other technical fields.

First Embodiment

Hereinafter, a liquid discharge device according to First Embodiment of the art of this disclosure will be explained. The liquid discharge device according to this Embodiment is an inkjet recording device (recording device) which circulates liquid such as ink between a tank and a liquid discharge head. However, in this Embodiment, a form of supplying ink to the liquid discharge head may be other forms. For example, the following embodiments can be applied to a recording device in which, without circulating the ink, a tank is provided on an upstream side and a downstream side of the liquid discharge head, respectively, and the ink is caused to flow by causing the ink to flow from one of the tanks to the other tank.

Moreover, the liquid discharge device of this Embodiment is assumed to be a liquid discharge device of a so-called line-type head having a liquid discharge head with a length corresponding to a width of a recording medium to which the ink is discharged. However, the liquid discharge device of this Embodiment may be a liquid discharge device having a so-called serial-type liquid discharge head which discharges the ink while scanning the recording medium. As the serial-type liquid discharge head, such a configuration can be cited that a recording element board for black ink and recording element boards for color inks are mounted, respectively, for example. However, not limited to them, such a configuration may be used that a line head with a length shorter than the width of the recording medium on which a plurality of recording element boards are disposed along a discharge-port row direction so that the discharge ports overlap each other is caused to scan the recording medium.

(Explanation on Inkjet Recording Device) FIG. 1 illustrates a schematic configuration diagram of a liquid discharge device or particularly an inkjet recording device 1000 (hereinafter, also referred to as a recording device) which performs recording by discharging ink of this Embodiment. The recording device 1000 has a conveyance portion 1 for conveying a recording medium 2, and line-type liquid discharge heads 3B, 3C, 3M, 3Y (hereinafter, also referred to as a liquid discharge head 3) disposed substantially orthogonal to a conveyance direction of the recording medium 2. The liquid discharge heads 3B, 3C, 3M, 3Y discharge ink for black, ink for cyan, ink for magenta, ink for yellow, respectively. As a result, the recording device 1000 is capable of full-color print by so-called CMYK ink.

The recording device 1000 is a line-type recording device which performs continuous recording in one pass while continuously or intermittently conveying a plurality of the recorded mediums 2. The recording medium 2 is not limited to cut paper but may be continuous rolled paper. Moreover, the recording medium 2 is not limited to paper but may be a film or the like. As will be described later, a supply path for supplying the ink to the liquid discharge head 3, a main tank and a buffer tank (see FIG. 2) are fluidly connected. Moreover, to the liquid discharge head 3, an electric control portion which transmits electricity and a discharge control signal to the liquid discharge head 3 is electrically connected. A liquid flow passage and an electric signal path in the liquid discharge head 3 will be described later.

Figure 2:
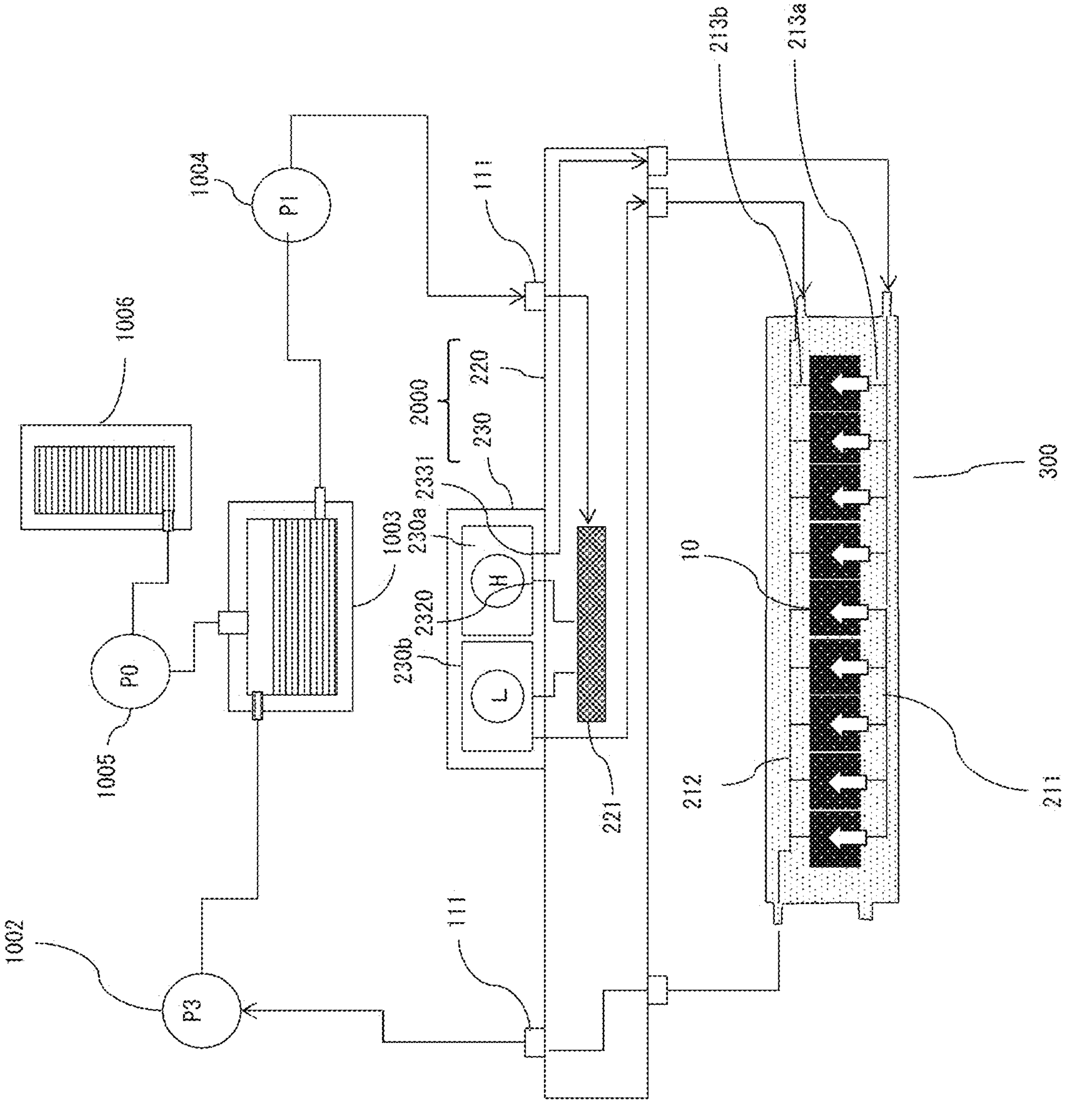
FIG. 2 is a schematic diagram illustrating a liquid flow passage of the liquid discharge device according to an Embodiment.

(Ink Circulation System) FIG. 2 is a schematic diagram illustrating a circulation flow passage applied to the recording device of this Embodiment. As shown in FIG. 2, the liquid discharge head 3 is fluidly connected to a first circulation pump 1002, a buffer tank 1003 and the like. Note that, in FIG. 2, in order to simplify the explanation, only a flow passage through which ink in one color in the CMYK inks flows is illustrated, but in actuality, circulation flow passages in four colors are provided in the liquid discharge head 3 and the recording device 1000. The buffer tank 1003 as a sub tank connected to a main tank 1006 as a liquid supply source has an atmospheric-air communication port (not shown) causing an inside and an outside of the tank to communicate with each other and can eject air bubbles in the ink to the outside. The main tank 1006 stores the ink supplied to the liquid discharge head 3, which will be explained below. The buffer tank 1003 is connected also to a replenishing pump 1005. In the liquid discharge head 3, ink is consumed by discharging (ejecting) the ink through the discharge port of the liquid discharge head such as recording by discharging the ink, suction recovery or the like. At this time, the replenishing pump 1005 transfers the ink in an amount according to a consumption amount from the main tank 1006 to the buffer tank 1003.

The first circulation pump 1002 withdraws the ink from a liquid connecting portion 111 of the liquid discharge head 3 and causes it to flow to the buffer tank 1003. When the liquid discharge head 3 is being driven, a certain amount of the ink flows in a common recovery flow-passage 212 by the first circulation pump 1002. A negative-pressure control unit 230 is provided in a flow passage between a second circulation pump 1004 and a liquid discharge unit 300. The negative-pressure control unit 230 operates such that, even if a flow rate of a circulation system is fluctuated by a difference in Duty for recording, a pressure on a downstream side (the liquid discharge unit 300 side) of the negative-pressure control unit 230 is maintained at a certain pressure set in advance.

As shown in FIG. 2, the negative-pressure control unit 230 includes two pressure adjustment mechanisms for which control pressures different from each other are set, respectively. The negative-pressure control unit 230 has two negative-pressure control mechanisms, that is, a negative-pressure adjustment mechanism on a relatively high pressure side (a side indicated by "H" in FIG. 2) and a negative-pressure adjustment mechanism on a relatively low pressure side (a side indicated by "L" in FIG. 2). These two negative-pressure adjustment mechanisms are connected to a common supply flow-passage 211 and the common recovery flow-passage 212 of the liquid discharge unit 300 via a liquid supply unit 220, respectively.

In the liquid discharge unit 300, the common supply flow-passage 211, the common recovery flow-passage 212, and an individual supply flow-passage **213*a* and an individual recovery flow-passage 213*b* (hereinafter, also referred to as an individual flow-passage 213) communicating with each of the recording element boards are provided. The individual flow-passage 213 communicates with the common supply flow-passage 211 and the common recovery flow-passage 212. Moreover, since the negative-pressure adjustment mechanism H is connected to the common supply flow-passage 211, and the negative-pressure adjustment mechanism L to the common recovery flow-passage 212, a differential pressure is generated between the two common flow passages. As a result, the ink flows from the common supply flow-passage 211 to the common recovery flow-passage 212 by passing through an internal flow passage of the recording element board 10 (a flow indicated by an arrow in FIG. 2**).

As described above, in the liquid discharge unit 300, while the ink is caused to flow so as to pass through the common supply flow-passage 211 and the common recovery flow-passage 212, respectively, such a flow that a part of the ink passes through an inside of each of the recording element boards 10 is generated. Thus, heat generated in each of the recording element boards 10 can be ejected to the outside of the recording element boards 10 by the flows of the common supply flow-passage 211 and the common recovery flow-passage 212. Moreover, by means of the configuration as above, when the recording by the liquid discharge head 3 is being performed, the flow of the ink can be generated also in the discharge port or a fluid chamber, where the recording is not being performed and thus, thickening of the ink in those parts can be suppressed. Moreover, the thickened ink or foreign substances in the ink can be ejected to the common recovery flow-passage 212. Therefore, according to the liquid discharge head 3 of the recording device 1000 of this Embodiment, a high-speed and high image-quality recording can be performed for the recording medium.

The two negative-pressure adjustment mechanisms disposed in the negative-pressure control unit 230 do not necessarily have to be controlled to a negative pressure, but the pressure only needs to be controlled such that the negative pressure is maintained at the discharge port. In the control of a pressure value at the discharge port, fluctuation in the pressure in a flow passage from the negative-pressure adjustment mechanism to the discharge port needs to be suppressed and thus, it is preferable that the negative-pressure adjustment mechanism is disposed at a position close to the discharge port. Therefore, it is more preferable that the negative-pressure control unit 230 is mounted on the liquid discharge head 3.

A unit combining the liquid supply unit 220 and the negative-pressure control unit 230 shown in FIG. 2 is called a pressure control assembly 2000, here. In order to realize high image-quality print for the recording medium, a pressure difference is held by suppressing fluctuation of a pressure loss generated in the flow passage from the two negative-pressure adjustment mechanisms to the discharge port, and a circulation flow speed flowing through the discharge port is made stable. Thus, it is preferable to have such a configuration that the negative-pressure control unit 230 is mounted on the liquid discharge head 3, and a flow-passage length from the negative-pressure adjustment mechanism of the negative-pressure control unit 230 to the discharge port is made shorter so as to reduce the pressure loss.

Figure 3A:
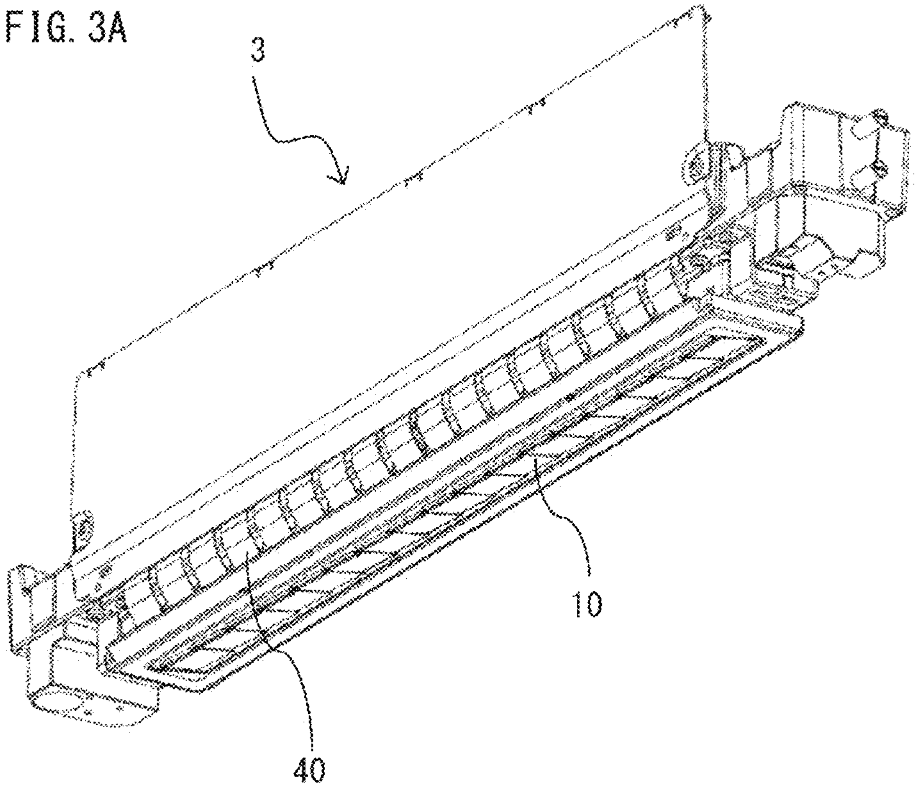
FIGS. 3A and 3B are schematic perspective views illustrating a liquid discharge head according to an Embodiment.
Figure 3B:
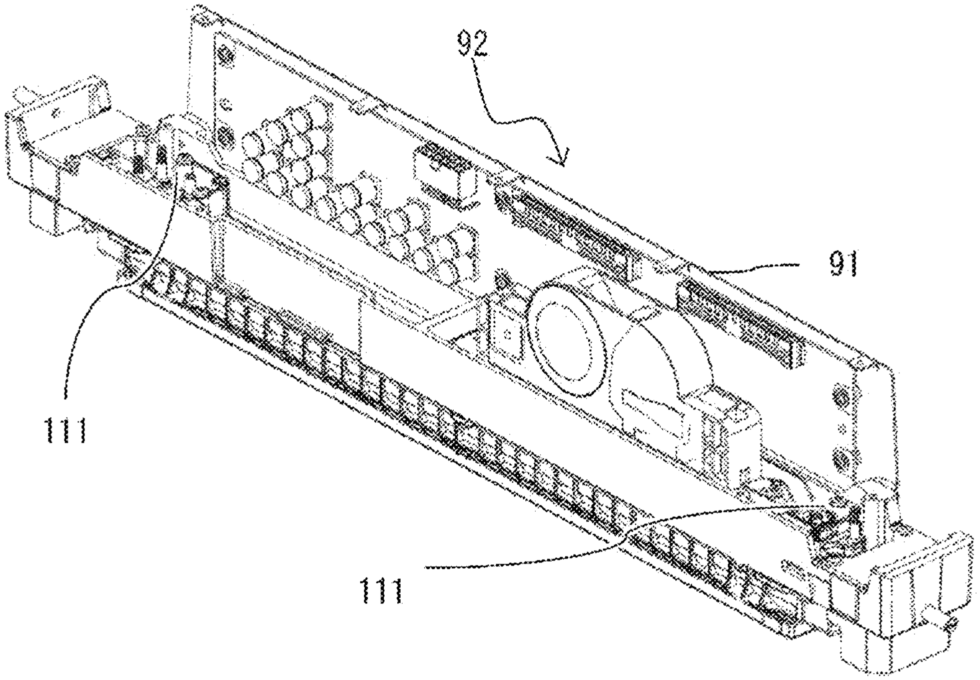

(Explanation on Liquid Discharge Head Configuration) A configuration of the liquid discharge head 3 according to this Embodiment will be explained. FIGS. 3A and 3B are perspective views of the liquid discharge head 3 according to this Embodiment. The liquid discharge head 3 is the line-type liquid discharge head 3 in which 17 pieces of the recording element boards 10 are aligned (in-line disposition) as an example on a straight line.

As shown in FIGS. 3A and 3B, the liquid discharge head 3 includes a signal input terminal 91 and an electricity supply terminal 92 electrically connected to each of the recording element boards 10 via a flexible wiring board 40 and an electric wiring board 90. The signal input terminal 91 and the electricity supply terminal 92 are electrically connected to a control portion of the recording device 1000 and supply electricity required for a discharge drive signal and discharge of the ink to the recording element board 10, respectively. By collecting the wirings by an electric circuit in the electric wiring board 90, the numbers of the signal input terminals 91 and the electricity supply terminals 92 can be made smaller than the number of the recording element boards 10. As a result, when the liquid discharge head 3 is assembled to the recording device 1000 or when the liquid discharge head 3 is replaced, the number of electric connection parts required to be removed can be made smaller.

As shown in FIG. 3B, the liquid connecting portions 111 provided on both ends of the liquid discharge head 3 are connected to a liquid supply system of the recording device 1000. As a result, the ink in four colors of CMYK is supplied from the supply system of the recording device 1000 to the liquid discharge head 3, and the ink having passed through the liquid discharge head 3 is recovered by the supply system of the recording device 1000. As described above, the ink in each color can be circulated by the flow passage of the recording device 1000 and the flow passage of the liquid discharge head 3.

Figure 4:
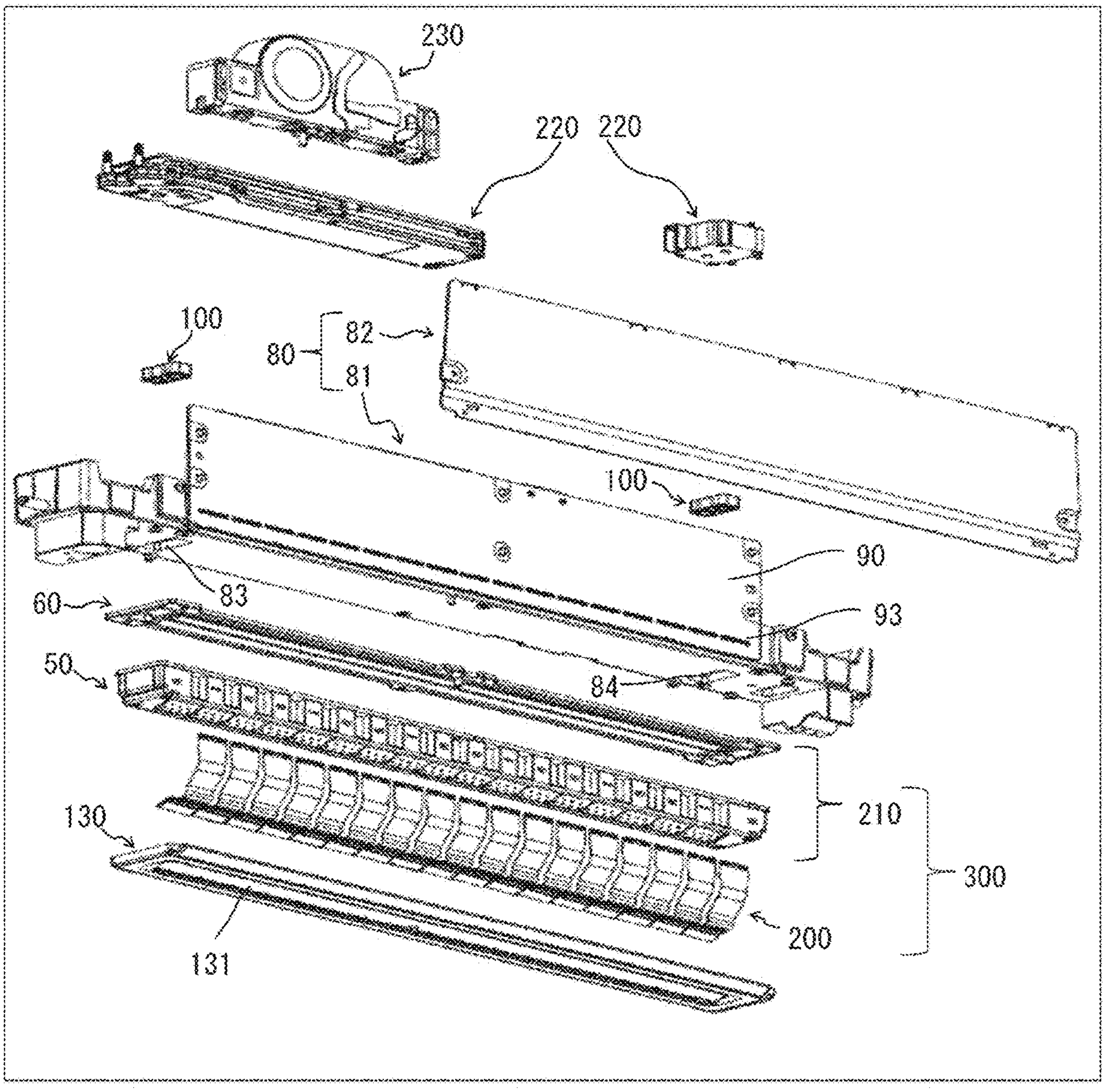
FIG. 4 is an exploded perspective view illustrating the liquid discharge head according to an Embodiment.

FIG. 4 shows an exploded perspective view of each component or unit constituting the liquid discharge head 3. The liquid discharge unit 300, the liquid supply unit 220, and the electric wiring board 90 are mounted on a housing 80. In the liquid supply unit 220, the liquid connecting portion 111 is provided, and in the liquid supply unit 220, in order to remove foreign substances in the supplied ink, a filter 221 for each color communicating with each opening of the liquid connecting portion 111 is provided. The two liquid supply units 220 have the filters 221 in two colors each, respectively.

The ink having passed through the filter 221 is supplied to the negative-pressure control unit 230 disposed on the liquid supply unit 220 in accordance with the respective colors. The negative-pressure control unit 230 is a unit constituted by pressure control valves for each of the colors. And by means of operations of the valve, a spring member and the like provided in each of the pressure control valves, a pressure-loss change in the supply system of the recording device 1000 (supply system on an upstream side of the liquid discharge head 3) generated with the fluctuation in the flow rate of the ink attenuates. And the negative-pressure control unit 230 stabilizes the negative-pressure change on the downstream side (liquid discharge unit 300 side) of the negative-pressure control unit 230 within a certain range. In the negative-pressure control unit 230 in each color, as shown in FIG. 2, two pressure control valves are incorporated for each color. The two pressure control valves are set to control pressures, different from each other, and a high-pressure side communicates with the common supply flow-passage 211 in the liquid discharge unit 300, while a low-pressure side communicates with the common recovery flow-passage 212 via the liquid supply unit 220.

The housing 80 is constituted by a liquid-discharge unit supporting-portion 81 and an electric-wiring board supporting portion 82, supports the liquid discharge unit 300 and the electric wiring board 90, and ensures rigidity of the liquid discharge head 3. The electric-wiring board supporting portion 82 supports the electric wiring board 90 and is fixed to the liquid-discharge unit supporting-portion 81 by screwing. The liquid-discharge unit supporting-portion 81 corrects warping or deformation of the liquid discharge unit 300 and ensures relative positional accuracy of a plurality of the recording element boards 10, thereby suppressing streaks and unevenness in the recording. Thus, the liquid-discharge unit supporting-portion 81 preferably has sufficient rigidity, and as a material, a metal material such as SUS and aluminum or ceramic such as alumina is preferable. In the liquid-discharge unit supporting-portion 81, openings 83, 84 into which a joint rubber 100 is inserted are provided. The ink to be supplied from the liquid supply unit 220 is led to a second flow-passage member 60 constituting the liquid discharge unit 300 via the joint rubber 100.

The liquid discharge unit 300 is constituted by a plurality of discharge modules 200 and a flow-passage member 210, and a cover member 130 is mounted on a surface on the recorded medium side of the liquid discharge unit 300. Here, the cover member 130 is, as shown in FIG. 4, a member having a frame-like surface in which a lengthy opening 131 is provided, and from the opening 131, the recording element board 10 and a sealing member 110 (FIG. 7A) included in the discharge module 200 are exposed. A frame part around the opening 131 has a function as a contact surface of a cap member which caps the liquid discharge head 3 during recording stand-by. Thus, it is preferable that a closed space is formed when being capped by applying an adhesive, a sealing material, a filling material or the like along a periphery of the opening 131 so as to fill irregularity or gaps on a discharge port surface of the liquid discharge unit 300.

Subsequently, a configuration of the flow-passage member 210 included in the liquid discharge unit 300 will be explained. As shown in FIG. 4, the flow-passage member 210 is constituted by laminating the first flow-passage member 50 and the second flow-passage member 60, and a plurality of the discharge modules 200 are bonded to a bonding surface 53 of the first flow-passage member 50 by an adhesive (not shown). The flow-passage member 210 is configured to be a flow passage to distribute a liquid supplied from the liquid supply unit 220 to each of the discharge modules 200 and to return the liquid circulating from the discharge module 200 to the liquid supply unit 220. The flow-passage member 210 is fixed to the liquid-discharge unit supporting-portion 81 by screwing.

Figure 5A:
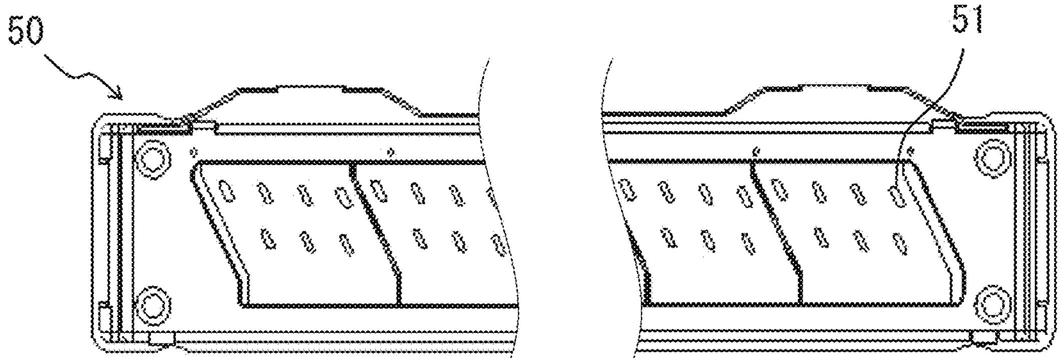
FIGS. 5A to 5C are schematic diagrams illustrating a flow passage formed in a flow-passage member according to an Embodiment.
Figure 5B:
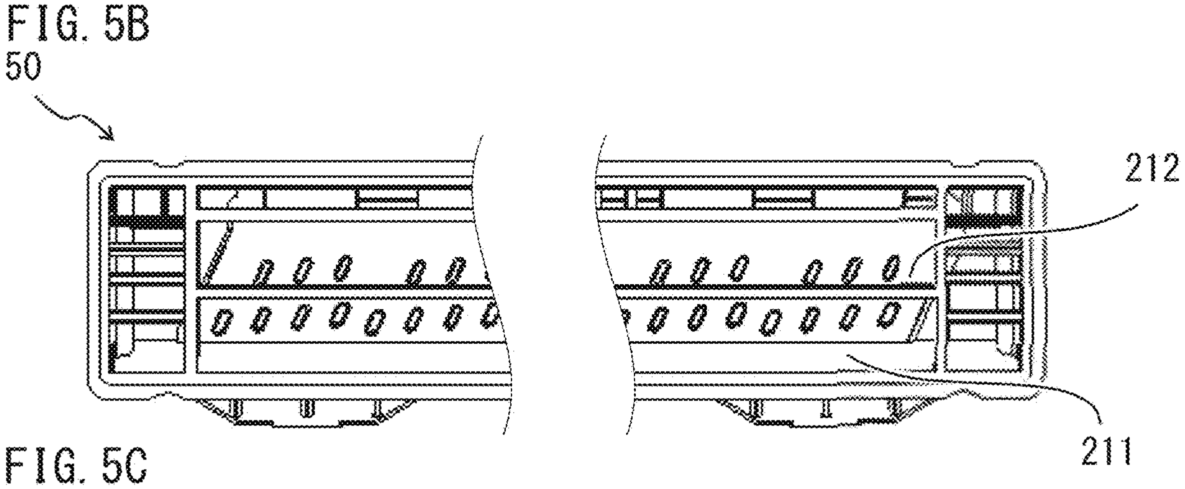
Figure 5C:
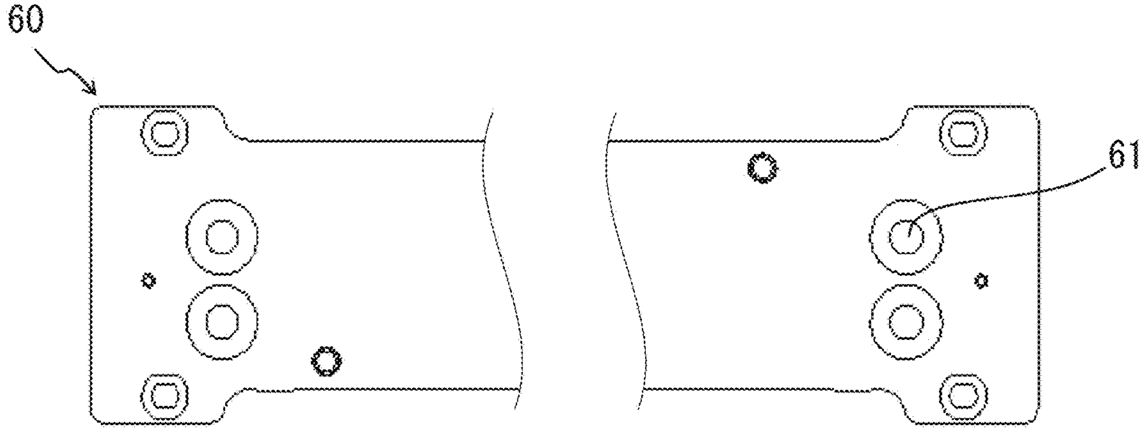

FIGS. 5A to 5C are diagrams for explaining a detailed configuration of the flow-passage member 210. FIGS. 5A and 5B illustrate front/rear surfaces of the first flow-passage member 50, FIG. 5C for a front surface of the second flow-passage member 60, respectively. FIG. 5A is a contact surface with the recording element board 10, and FIG. 5C is a contact surface with the liquid supply unit 220. Moreover, the surface of the first flow-passage member 50 shown in FIG. 5B and a rear surface of the second flow-passage member 60 shown in FIG. 5C are brought into contact with each other.

Communication ports 51 of a repeated pattern are aligned in the Y-direction in the first flow-passage member 50, and one piece of the recording element board 10 corresponds to the repeated pattern. As shown in FIG. 5A, in the surface of the first flow-passage member 50 to be brought into contact with the recording element board 10, the communication port 51 fluidly connected to the recording element board 10 and to be the individual supply flow-passage 213*a* and the individual recovery flow-passage 213*b* explained in FIGS. 2A and 2B are formed.

As shown in FIG. 5C, a common flow-passage groove 62 extending in the Y-direction and to be the common supply flow-passage 211 and the common recovery flow-passage 212 explained in FIGS. 2A and 2B is formed. In both end parts of the common flow-passage groove 62, a common communication port 61 fluidly communicating with the liquid supply unit 220 is formed.

Figure 6A:
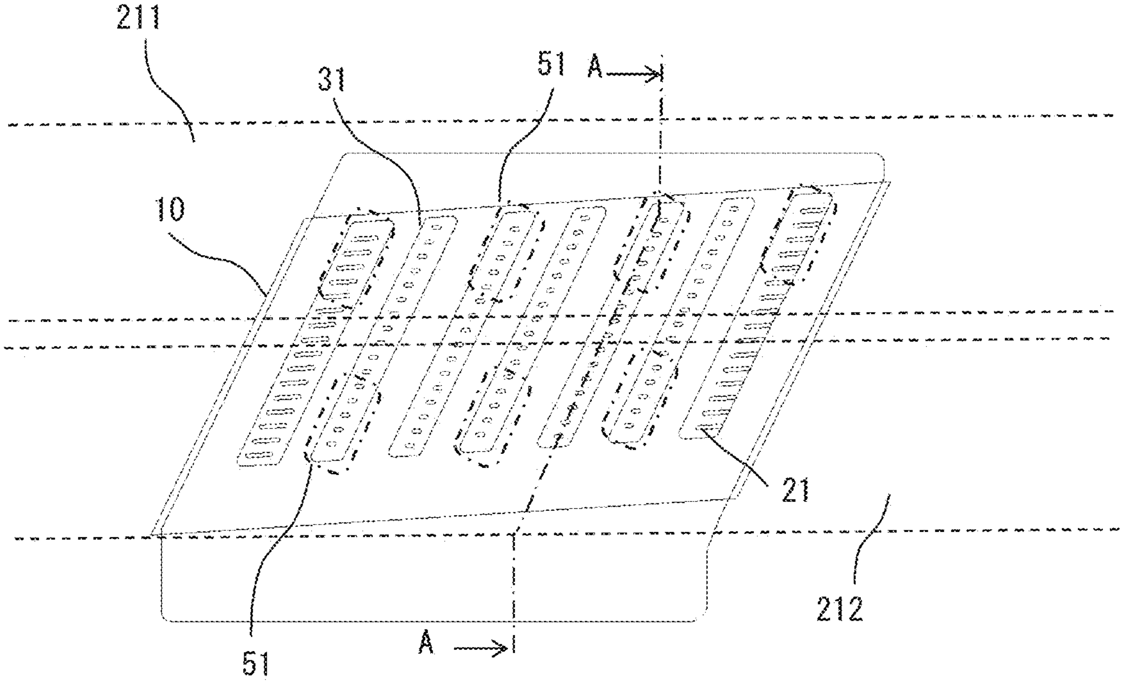
FIGS. 6A and 6B are schematic perspective views illustrating a liquid discharge unit according to an Embodiment.
Figure 6B:
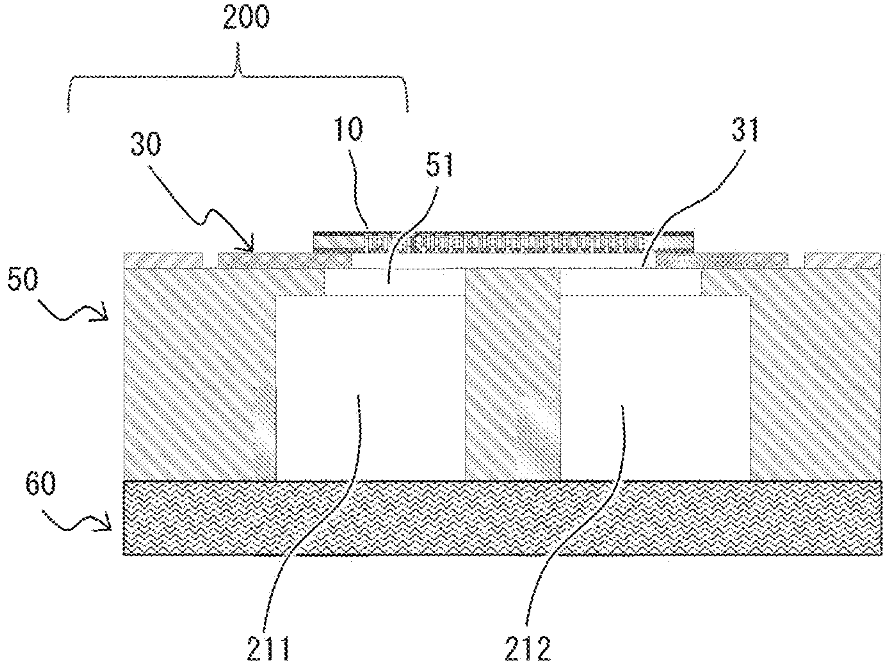

FIGS. 6A and 6B are a perspective view and a sectional view for explaining a flow-passage structure formed inside the flow-passage member 210. FIG. 6B is an A-A sectional diagram of FIG. 6A. The common supply flow-passage 211 and the common recovery flow-passage 212 extending in a longitudinal direction (Y-direction) of the first flow-passage member 50 are fluidly connected to the opening 21 of the recording element board 10 via the communication port 51 of the first flow-passage member 50 and the liquid supply port 31 of a support member 30.

As already explained, the common supply flow-passage 211 is connected to a first negative-pressure control unit 230*a* with a relatively high pressure, and the common recovery flow-passage 212 is connected to a second negative-pressure control unit 230*b* with a relatively low pressure. Thus, an ink supply flow-passage to the recording element board 10 constituted by the common communication port 61 (see FIG. 5C), the common supply flow-passage 211, the communication port 51 (individual supply flow-passage 213*a*), and the recording element board 10 is formed. Similarly, an ink recovery flow-passage constituted by the recording element board 10, the communication port 51 (individual recovery flow-passage 213*b*), the common recovery flow-passage 212, and the common communication port 61 (see FIG. 5C) is formed. While the ink is circulated as above, in the recording element board 10, a discharging operation according to discharge data is performed, and the ink which has not been consumed by the discharging operation of the ink supplied in the ink supply flow-passage is recovered in the ink recovery flow-passage.

Figure 7A:
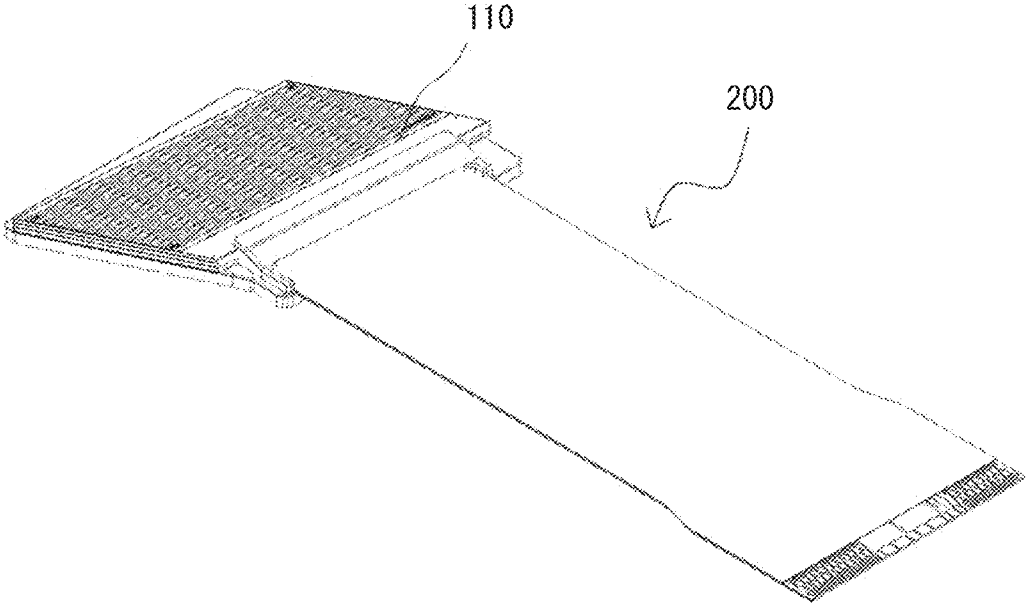
FIGS. 7A and 7B are schematic perspective views illustrating a configuration of a discharge module according to an Embodiment.
Figure 7B:
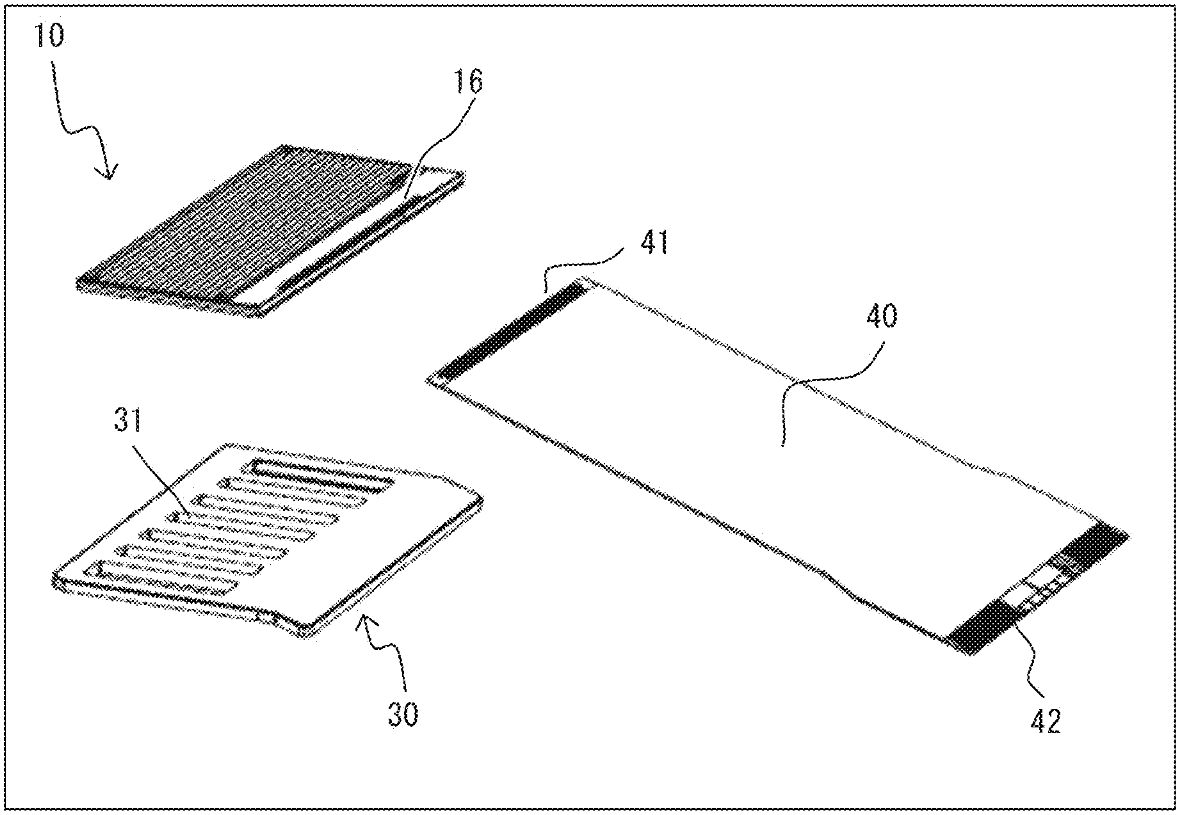

(Explanation on Discharge Module) FIG. 7A is a perspective view illustrating one piece of the discharge module 200, and FIG. 7B is an exploded view thereof. As a manufacturing method of the discharge module 200, first, the recording element board 10 and the flexible wiring board 40 are bonded onto the support member 30 on which the liquid supply port 31 is provided in advance. After that, a terminal 16 on the recording element board 10 and a terminal 41 on the flexible wiring board 40 are electrically connected by wire bonding and then, a wiring bonding portion (electric connecting portion) is sealed by covering with the sealing member 110. A terminal 42 on a side opposite to the recording element board 10 of the flexible wiring board 40 is electrically connected to a connection terminal 93 of the electric wiring board 90 (see FIG. 4). The support member 30 is a support body for supporting the recording element board 10 and is also a flow-passage member which causes the recording element board 10 to fluidly communicate with the flow-passage member 210 and thus, it is preferably the one which has a high flatness degree and can be bonded with the recording element board with sufficiently high reliability. As a material of the support member 30, alumina or a resin material, for example, is preferable.

Figure 8A:
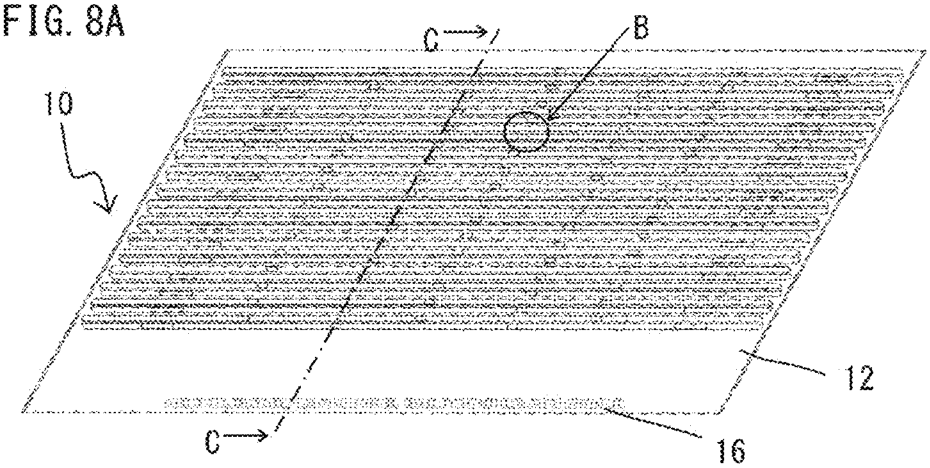
FIGS. 8A to 8C are bird's eye views illustrating a configuration of a recording element board according to an Embodiment.
Figure 8B:
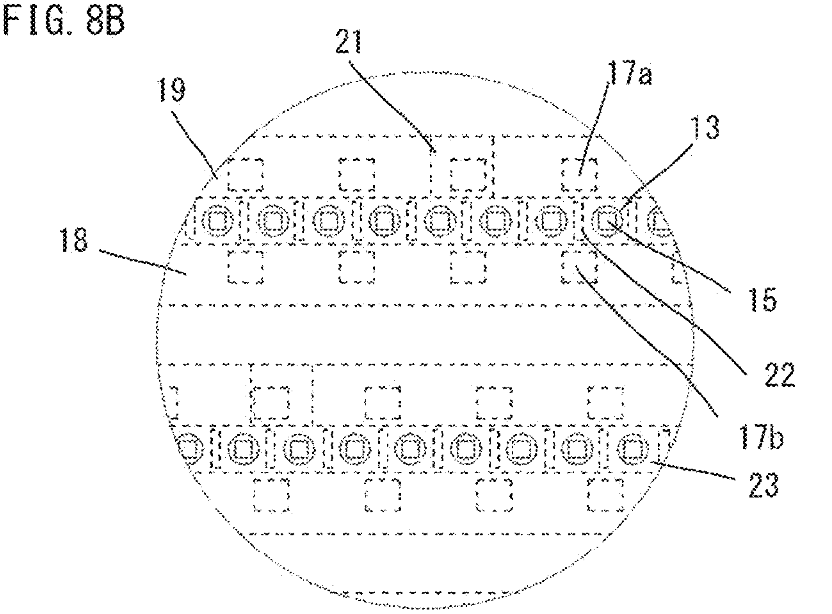
Figure 8C:
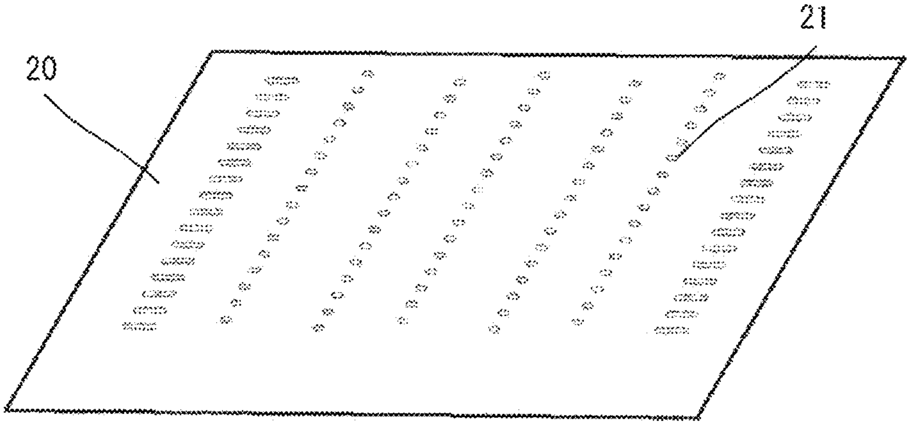

(Explanation on Structure of Recording Element Board) FIG. 8A illustrates a plan view of a surface on a side where a discharge port 13 of the recording element board 10 is formed, FIG. 8B illustrates an enlarged view of a part surrounded by a circle indicated by B in FIG. 8A, and FIG. 8C illustrates a plan view of a rear surface of FIG. 8A. Here, a configuration of the recording element board 10 in this Embodiment will be explained.

In FIG. 8A, a view when four rows of the discharge-port rows are formed in the discharge-port forming member 12 of the recording element board 10 is shown, but the number of the discharge-port rows is not limited to that. Note that, hereinafter, a direction in which the discharge-port row in which a plurality of the discharge ports 13 are aligned extends will be referred to as a "discharge-port row direction".

As shown in FIG. 8B, at a position corresponding to each of the discharge ports 13, a recording element 15, which is a heat generating element (pressure generating element) for foaming the ink by using thermal energy, is disposed. By means of a partition wall 22, a fluid chamber 23 including the recording element 15 inside is partitioned. The recording element 15 is electrically connected to the terminal 16 by an electric wiring (not shown) provided on the recording element board 10. And the recording element 15 generates heat and boils the ink on the basis of a pulse signal input through the electric wiring board 90 and the flexible wiring board 40 from a control circuit of the recording device 1000. By means of a force of foaming by this boiling, the ink is discharged from the discharge port 13. As shown in FIG. 8B, along each of the discharge-port rows, a liquid supply path 18 extends on one side, while a liquid recovery path 19 extends on the other side. The liquid supply path 18 and the liquid recovery path 19 are flow passages extending in the discharge-port row direction provided on the recording element board 10 and communicate with the discharge port 13 via a supply port 17*a* and a recovery port 17*b*, respectively.

As shown in FIG. 8C, on the rear surface of a surface on which the discharge port 13 is formed in the recording element board 10, a sheet-like cover plate 20 is laminated, and in the cover plate 20, a plurality of openings 21 (opening row) communicating with the liquid supply path 18 and the liquid recovery path 19, which will be described later, are provided. In this Embodiment, three pieces of the openings 21 with respect to one piece of the liquid supply path 18 and two pieces of the openings 21 with respect to one piece of the liquid recovery path 19 are provided in the cover plate 20, respectively. Note that the number of the openings 21 is not limited to that.

As shown in FIG. 8B, the respective openings 21 in the cover plate 20 communicate with the plurality of communication ports 51 shown in FIG. 6A. The cover plate 20 preferably has sufficient corrosion resistance to ink, and from a viewpoint of preventing color-mixing of ink, an opening shape and an opening position of the opening 21 are required to be disposed with high accuracy. Therefore, it is preferable that a photosensitive resin material or a silicon plate is used as a material for the cover plate 20, and the opening 21 is provided by a photolithographic process.

Figure 9:
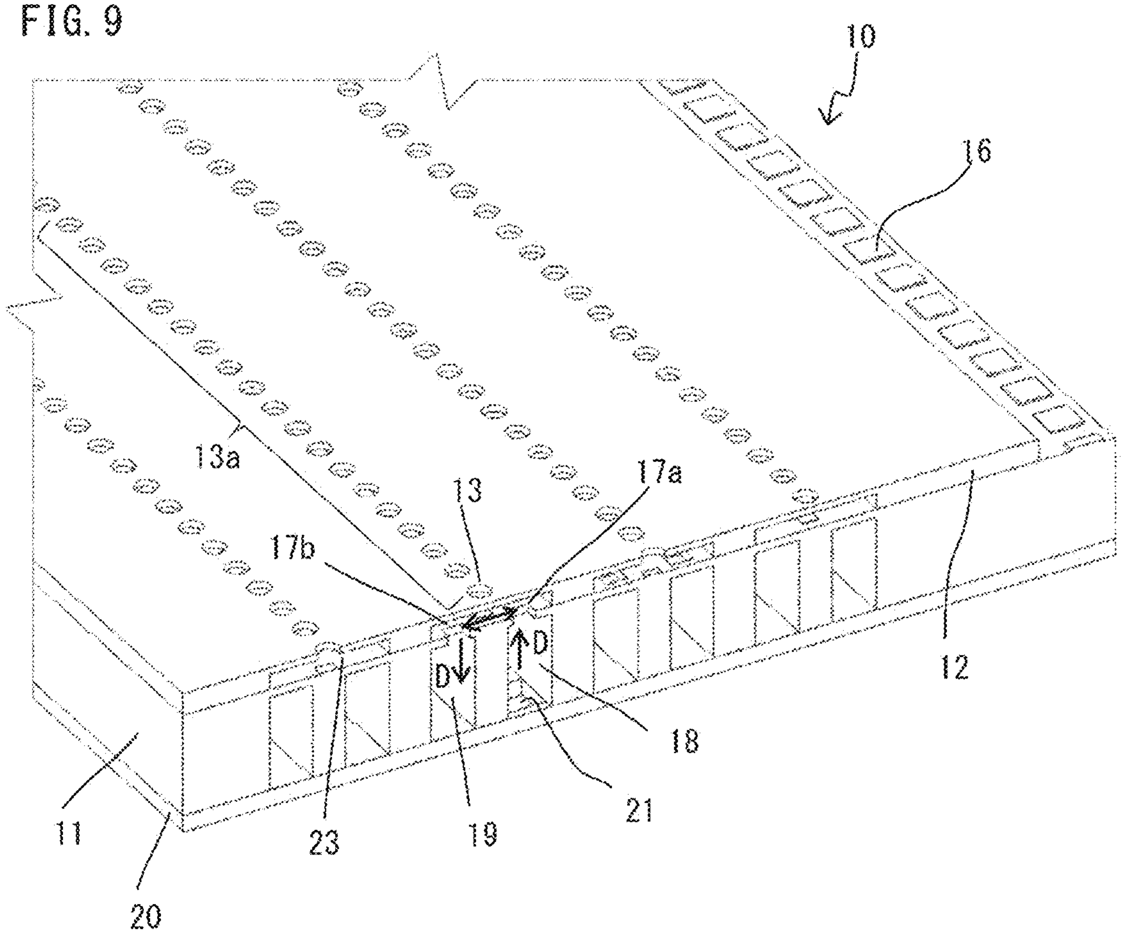
FIG. 9 is a sectional perspective view of the recording element board according to an Embodiment.

FIG. 9 is a perspective view of the recording element board 10 and a section of the cover plate (lid member) 20 by a C-C line in FIG. 8A. Here, a flow of the ink in the recording element board 10 will be explained. The cover plate 20 has a function as a lid which forms parts of walls of the liquid supply path 18 and the liquid recovery path 19 formed on a board 11 of the recording element board 10. In the recording element board 10, the board 11 formed by Si and a discharge-port forming member 12 formed by a photosensitive resin are laminated, and to the rear surface of the board 11, the cover plate 20 is bonded. On one of surface sides of the board 11, the recording element 15 is formed (see FIG. 8B), and on a rear surface side thereof, a groove constituting the liquid supply path 18 and the liquid recovery path 19 extending along a nozzle row 13*a* in which a plurality of the discharge ports 13 are aligned is formed.

The liquid supply path 18 and the liquid recovery path 19 formed by the board 11 and the cover plate 20 are connected to the common supply flow-passage 211 and the common recovery flow-passage 212 in the flow-passage member 210, respectively, and a differential pressure is generated between the liquid supply path 18 and the liquid recovery path 19. When recording is performed by discharging the ink from the discharge port 13, at the discharge port which is not discharging the ink, the ink in the liquid supply path 18 provided in the board 11 flows by this differential pressure to the liquid recovery path 19 via the supply port 17*a*, the fluid chamber 23, and the recovery port 17*b* (arrow D). By means of this flow, in the discharge port 13 not performing the discharging operation and the fluid chamber 23, the thickened ink generated by evaporation from the discharge port 13, bubbles, foreign substances and the like can be recovered into the liquid recovery path 19. Moreover, thickening of the ink at the discharge port 13 or the fluid chamber 23 or an increase in the density of the color material can be suppressed. The ink having been recovered into the liquid recovery path 19 flows through the opening 21 of the cover plate 20 and the liquid supply port 31 of the support member 30 as shown in FIG. 7B. After that, the ink flows in the order of the liquid supply port 31 of the support member 30, the communication port 51 of the first flow-passage member 50, and the common recovery flow-passage 212 and is recovered by the supply flow-passage of the recording device 1000 (FIG. 2).

(Detailed Explanation of Negative-Pressure Control Unit)

Figure 10A:
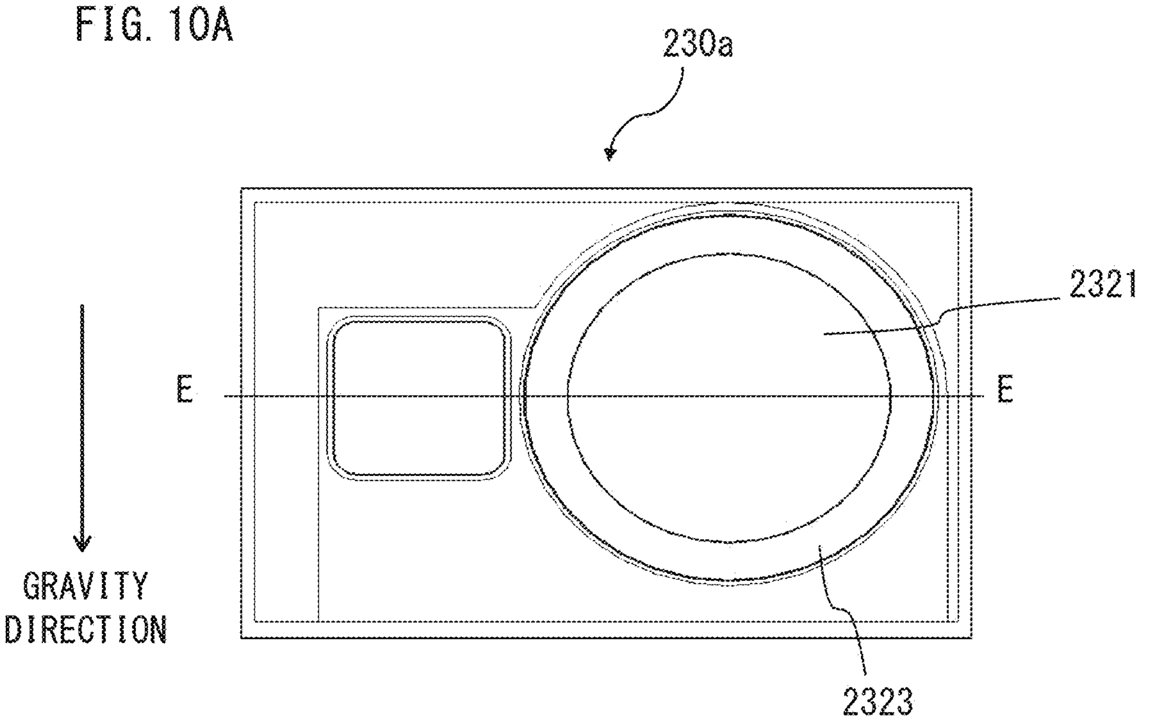
FIGS. 10A and 10B are schematic diagrams illustrating a negative-pressure control unit according to an Embodiment.
Figure 10B:
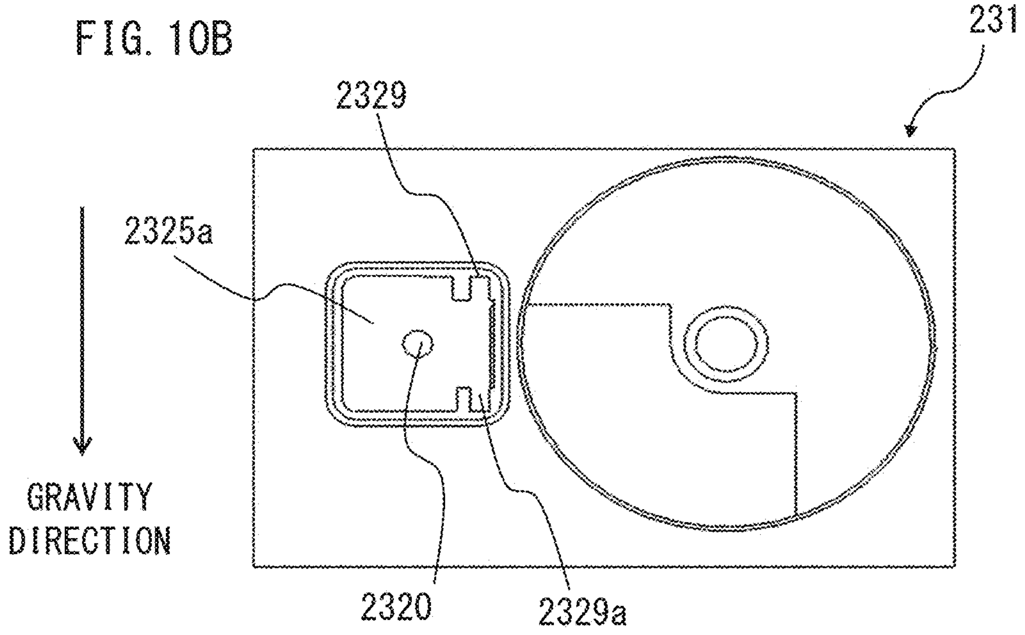

Subsequently, a problem to be solved by the art of this disclosure will be explained in detail. FIGS. 10A and 10B are views illustrating a structure of the negative-pressure control unit 230*a* (pressure-reducing valve) on the high-pressure side (H-side) in the negative-pressure control unit 230, which is a pressure control unit of ink used in this Embodiment. An operation principle of this negative-pressure control unit 230*a* is similar to the one called a "pressure-reducing regulator" in general. Note that, since the configuration and the operation of the negative-pressure control unit 230*b* on the low-pressure side (L-side) are similar to those of the negative-pressure control unit 230*a*, detailed explanation will be omitted in the following.

FIG. 10A is a view illustrating an appearance of the negative-pressure control unit 230*a*, and FIG. 10B illustrates a housing 231 of the negative-pressure control unit 230*a* for accommodating each of the constituent elements of the negative-pressure control unit 230*a*, which will be explained below. As shown in FIG. 10A, the negative-pressure control unit 230*a* has a pressure-receiving plate 2321 and a fluid chamber 2323. As will be explained below, the pressure-receiving plate 2321 is a movable member displaced in accordance with pressure fluctuation generated with a change in the ink amount in the fluid chamber 2323. By means of an operation of a lever 2327, which will be described later, by the operation of the pressure-receiving plate 2321, a flow of the ink flowing into the fluid chamber 2323, which is a fluid chamber through which the ink flows, and a pressure of the ink in the fluid chamber 2323 and the liquid supply path 18 are controlled.

Moreover, as shown in FIG. 10B, the housing 231 of the negative-pressure control unit 230*a* has a bearing portion 2329 with which a rotating shaft 2328, which will be explained below, is fitted, and an orifice 2320, which is an inflow port of the ink. The orifice 2320 is constituted by a circular opening provided on an upstream side (a liquid communication chamber 2324 side) through which the ink flows into the fluid chamber 2323 and a circular opening provided on a downstream side (fluid chamber 2323 side) thereof, and a cylindrical hole connecting these openings.

Figure 11:
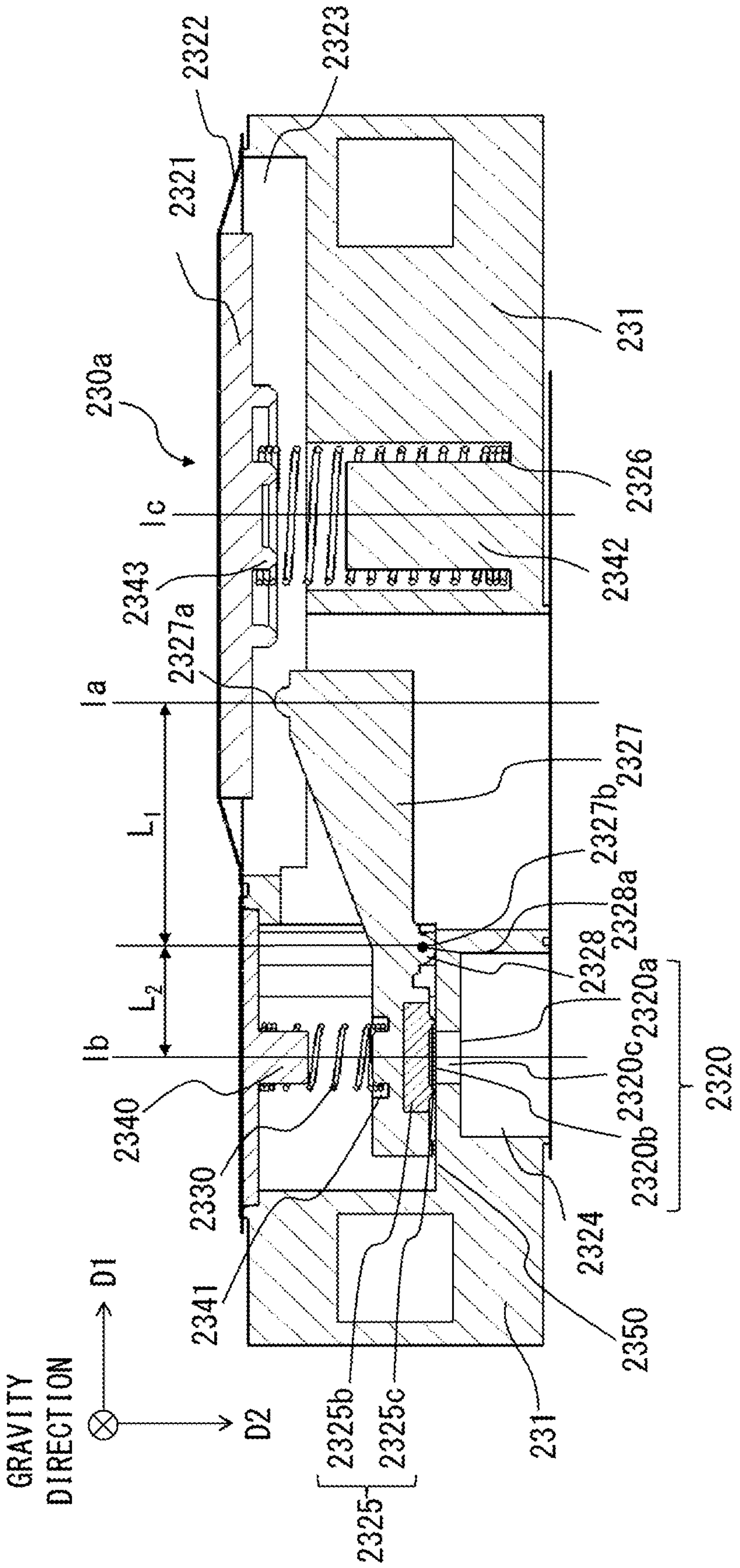
FIG. 11 is a schematic diagram illustrating a section of the negative-pressure control unit according to an Embodiment.
Figure 12:
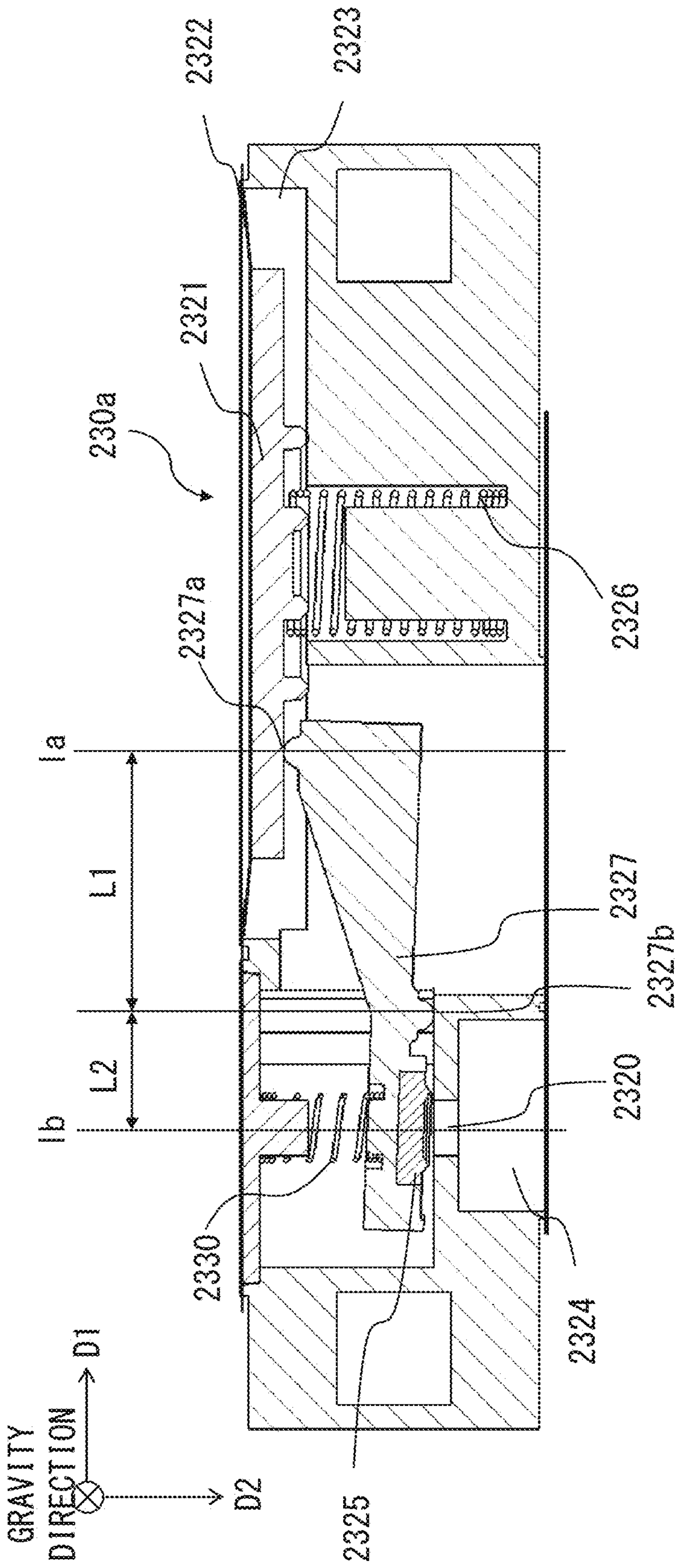
FIG. 12 is a schematic diagram illustrating a section of the negative-pressure control unit according to an Embodiment.

FIGS. 11 and 12 illustrate a section of the negative-pressure control unit 230*a* by an E-E line in FIG. 10A. As shown in FIGS. 11 and 12, the negative-pressure control unit 230*a* has the pressure-receiving plate 2321 functioning as a pressure-receiving portion, a flexible film 2322 which fluidly seals the pressure-receiving plate 2321 and the housing 231, and the fluid chamber 2323. Moreover, on an upstream side (paper-surface left side) of the ink flowing through the fluid chamber 2323, a movable valve 2325, which is a valve body interlocking with the pressure-receiving plate 2321 and the orifice 2320 with which the movable valve 2325 is fitted are provided. The orifice 2320 is an inflow port through which the ink in the main tank 1006, which is a liquid supply source, flows into the fluid chamber 2323. Moreover, the ink having flowed into the fluid chamber 2323 from the orifice 2320 is caused to flow out of an outflow port 2331 to the common supply flow-passage 211 (see FIG. 2).

The movable valve 2325 has a cylinder-shaped shaft body 2325*b* and a projection 2325*c*, which is a circular-shaped annular projection protruding to the orifice 2320 side on a surface opposed to the orifice 2320 of the shaft body 2325*b*. The movable valve 2325 is provided integrally with the lever 2327 disposed in the fluid chamber 2323. The movable valve 2325 is constituted so as to be capable of taking a closed position to close the orifice 2320 and an open position to open the orifice 2320. Moreover, the projection 2325*c* of the movable valve 2325 is formed so that an inner diameter of the projection 2325*c* is larger than an opening diameter of the orifice 2320. When the movable valve 2325 is at the closed position to close the orifice 2320, the projection 2325*c* of the movable valve 2325 is brought into contact with the housing 231 so as to surround the orifice 2320 and to close the orifice 2320. It is to be noted that a shape of the projection 2325*c* of the movable valve 2325 is not limited to a circular shape but may close a flow passage of the ink by contacting a wall surface 2350 so as to surround the orifice 2320 as a rectangular projection, for example.

The lever 2327 is connected to the movable valve 2325 on one end and is capable of contacting the pressure-receiving plate 2321 on the other end and has a rotating shaft 2328 contacting the fluid chamber 2323 between the one end and the other end. The lever 2327 is rotatable around a predetermined rotation axis of the rotating shaft 2328 with the rotating shaft 2328 as a fulcrum. Here, as an example, this rotation axis 2328*a* is an axis extending in a direction parallel to the paper surfaces of FIGS. 11 and 12 and is orthogonal to both a first direction D1 and a second direction D2.

FIG. 11 illustrates a state where the movable valve 2325 blocks the orifice 2320, the ink does not flow into the housing 231 from the liquid communication chamber 2324 via the orifice 2320, and pressure adjustment of the ink pressures of the fluid chamber 2323 and the common supply flow-passage 211 is not performed. Moreover, FIG. 12 illustrates a state where the ink flows into the housing 231 from the liquid communication chamber 2324 via the orifice 2320, and the pressure control of the ink pressures of the fluid chamber 2323 and the common supply flow-passage 211 is performed. Moreover, in FIG. 12, the lever 2327 rotates in accordance with displacement of the pressure-receiving plate 2321, and the movable valve 2325 is separated from the orifice 2320 with the rotation of the lever 2327 and opens the orifice 2320.

As shown in FIG. 11, the lever 2327 is urged to a direction in which the movable valve 2325 blocks the orifice 2320 by a spring 2330, which is an urging member. The movable valve 2325 is provided so as to block the orifice 2320 from a downstream side of the orifice 2320, that is, from an inside of the housing 231. Regarding the spring 2330, one end is fitted with a cylinder-shaped shaft portion 2340 formed in the housing 231, while the other end is fitted with an annular-shaped groove portion 2341 formed in the lever 2327. As a result, a direction in which the urging force of the spring 2330 acts becomes the second direction D2 intersecting with the gravity direction and orthogonal to the first direction D1. Note that, as long as adhesion of the ink in the orifice 2320 can be avoided, the first direction D1 and the second direction D2 may be directions intersecting with an angle other than the orthogonal. Moreover, at the closed position where the movable valve 2325 closes the orifice 2320, centers of the orifice 2320, the movable valve 2325, the groove portion 2341, the spring 2330, and the shaft portion 2340 are disposed so as to be aligned on a straight line (line of action 1*b* in the drawing).

Moreover, in a spring 2326, one end is fitted with the cylinder-shaped shaft portion 2342 formed in the housing 231, while the other end is fitted with an outer periphery part of the circular-shaped projection portion 2343 formed on the pressure-receiving plate 2321. Moreover, the centers of the spring 2326, the shaft portion 2342, the projection portion 2343 are disposed so as to be aligned on a straight line 1*c*.

When the ink flows out of the negative-pressure control unit 230*a* to the common supply flow-passage 211, in accordance with the pressure fluctuation in the fluid chamber 2323 generated with the decrease in the ink amount in the fluid chamber 2323, the pressure-receiving plate 2321 moves to a paper-surface lower direction. And when the pressure-receiving plate 2321 is brought into contact with the lever 2327, the lever 2327 is rotated in a direction parallel to the paper surface with this contact point 2327*a* as a power point and a contact point 2327*b* between the rotating shaft 2328 and the fluid chamber 2323 (housing 231) as a fulcrum. Moreover, in accordance with the rotation of the lever 2327, the movable valve 2325, which has blocked the orifice 2320, moves in a direction (paper-surface upper side) where a gap is generated from the orifice 2320. Then, the ink stored in the liquid communication chamber 2324 passes through the gap between the movable valve 2325 and the orifice 2320 from the orifice 2320 and flows into the fluid chamber 2323. The pressure of the ink having flowed into the fluid chamber 2323 is transmitted to the pressure-receiving plate 2321. When the pressure-receiving plate 2321 receives the pressure of the ink having flowed into the fluid chamber 2323 and is pushed up above the paper surface, the lever 2327 is rotated in accordance with the displacement of the pressure-receiving plate 2321. Moreover, together with the rotation of the lever 2327, the movable valve 2325 moves toward the orifice 2320 (paper-surface lower side) and blocks the orifice 2320 again. The ink in the fluid chamber 2323 is ejected to the common supply flow-passage 211 on the downstream side via the outflow port 2331.

Here, in the fluid chamber 2323, a position where the pressure-receiving plate 2321 acts on the movable valve 2325 via the lever 2327 so as to position the movable valve 2325 to the closed position corresponds to a first position of the pressure-receiving plate 2321. Moreover, a position where the pressure-receiving plate 2321 acts on the movable valve 2325 via the lever 2327 so as to position the movable valve 2325 to the open position corresponds to a second position of the pressure-receiving plate 2321. Moreover, the lever 2327 is a power transmitting member which transmits power by the pressure-receiving plate 2321 acting on the movable valve 2325 so as to move the movable valve 2325 to the open/closed position.

The spring 2326 applies an urging force to position the pressure-receiving plate 2321 to the first position to the pressure-receiving plate 2321. And the pressure-receiving plate 2321 is configured to displace from the first position to the second position in the second direction D2 against the urging force by a magnitude of the pressure (negative pressure) in the fluid chamber 2323 increasing larger than the urging force of the spring 2326. As described above, the second position of the pressure-receiving plate 2321 changes in accordance with the pressure in the fluid chamber 2323. Moreover, the orifice 2320 is formed such that, in a state where the liquid discharge head 3 is attached to the recording device 1000, the direction in which the ink flows into the orifice 2320 is the direction intersecting with the gravity direction.

The fluid chamber 2323 is filled with the ink, and a balance of forces applied to respective parts in the housing 231 is determined by the following relational equation (1). As indicated in the equation (1), the principle of leverage is used for this balance of forces. At this time, as shown in FIGS. 11 and 12, $L_1$ is a length obtained by suspending vertically downward from a fulcrum (2327*b* in the drawing), which is a contact point between the rotating shaft 2328 and the housing 231, to the line of action (1*a* in the drawing) of the force of the pressure-receiving plate 2321 pressing the lever 2327. Moreover, $L_2$ indicates a length obtained by suspending vertically downward from the fulcrum (2327*b* in the drawing) to the line of action (1*b* in the drawing) of the force pressing the center of the movable valve 2325. At this time, by changing a spring constant of a spring 2326, which is the urging member, a pressure by the ink on the upstream side when viewed from the orifice 2320, that is, a pressure $P_1$ by the ink in the liquid communication chamber 2324 can be set to a desired pressure.

$$(k_d x_d + P_2 S_d) * L_1 = (-k_v x_v + (P_1 - P_2) * S_v) * L_2 \quad (1)$$

Here, on a plane on which the lever 2327 is rotationally moved, shown in FIG. 11, FIG. 12, each value in the equation (1) is as follows.

$L_1$: Length obtained by suspending vertically downward from the fulcrum to the line of action of force of the pressure-receiving plate pressing the lever $L_2$: Length obtained by suspending vertically downward from the fulcrum to the line of action of force pressing the center of the movable valve $P_1$: Pressure by the ink on the orifice upstream side $P_2$: Pressure by the ink in the fluid chamber $k_d$: Spring constant of the spring 2326 in the fluid chamber $x_d$: Spring displacement of the spring 2326 in the fluid chamber $k_v$: Spring constant of the spring 2330 urging the movable valve $x_v$: Spring displacement of the spring 2330 urging the movable valve $S_d$: Pressure-receiving area from the ink of the pressure-receiving plate $S_v$: Pressure-receiving area from the ink of the movable valve Here, the pressure-receiving area $S_d$ from the ink of the pressure-receiving plate 2321 is a pressure-receiving area which the pressure-receiving plate 2321 receives from the ink in the fluid chamber 2323 and corresponds to an area of the pressure-receiving plate 2321 on a top view when the pressure-receiving plate 2321 is viewed in a displacement direction of the pressure-receiving plate 2321 in FIG. 10A. Moreover, the pressure-receiving area $S_v$ from the ink of the movable valve 2325 is a pressure-receiving area which the movable valve 2325 receives from the ink flowing in from the orifice 2320 and corresponds to the opening area of the orifice 2320 in FIG. 10B.

Moreover, from the equation (1), $P_2$ can be expressed by the following equation (2).

$$P_2 = (-k_d x_d L_1 - k_v x_v L_2 + P_1 S_v L_2)/(S_d L_1 + S_v L_2) \quad (2)$$

Moreover, assuming that valve resistance against the ink by the movable valve 2325 is R, and a flow rate of the ink passing through the orifice 2320 is Q, the following equation (3) is established.

$$P_2 = P_1 - QR \quad (3)$$

Figure 13:
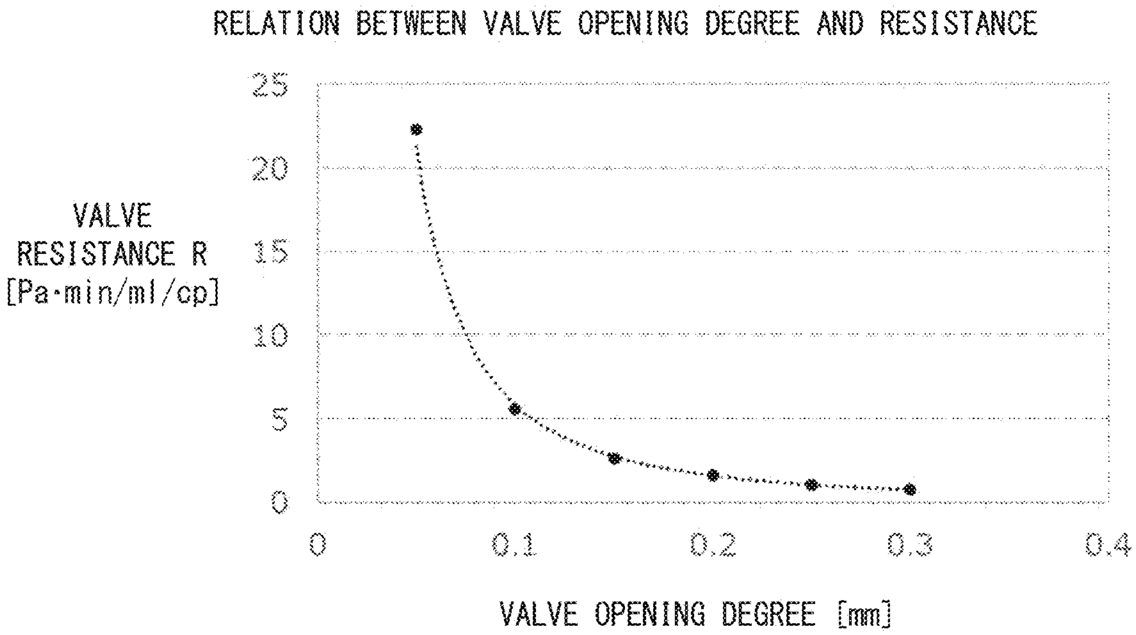
FIG. 13 is a graph illustrating a relation between valve resistance and a valve opening degree in an Embodiment.

Here, the valve resistance R and the valve opening degree in the movable valve 2325 are designed to have such a relation shown in a graph in FIG. 13, for example. That is, as the valve opening degree of the movable valve 2325 increases, the valve resistance R lowers. Moreover, by determining the valve position so that the equation (2) and the equation (3) are established at the same time, $P_2$ is determined.

A pressure of a pressurization source (not shown) connected to an upstream of the negative-pressure control unit 230*a* is constant. Therefore, when the flow rate Q of the ink flowing into the negative-pressure control unit 230*a* increases, $P_1$ decreases by an increase part of the resistance between the negative-pressure control unit 230*a* and the buffer tank 1003 caused by the increase in the flow rate Q. As a result, a force $P_1 S_v$ for opening the movable valve 2325 is decreased, and as calculated from the equation (2), $P_2$ instantaneously increases.

Moreover, from the equation (3), the following equation (4) is derived.

$$R = (P_1 - P_2)/Q \quad (4)$$

At this time, Q, $P_2$ increase, while $P_1$ decreases and thus, R decreases. When R decreases, the valve opening degree of the movable valve 2325 increases. As shown in FIG. 11, when the valve opening degree of the movable valve 2325 increases, the length of the spring 2330 becomes shorter and thus, x, which is displacement from a free length, increases. Therefore, an action force kx of the spring 2330 becomes larger, and as calculated from the equation (2), $P_2$ instantaneously decreases.

Moreover, when $P_2$ instantaneously decreases, $P_2$ increases by an action opposite to the aforementioned. As described above, by means of the repetition of the instantaneous increase and decrease of $P_2$, the valve opening degree of the movable valve 2325 changes in accordance with the flow rate Q of the ink. And since the equation (2) and the equation (3) are established, as the result of substantially constant control of $P_2$, the pressure by the ink in the fluid chamber 2323 and thus, in the common supply flow-passage 211 is also controlled to be substantially constant.

In this Embodiment, as shown in FIG. 10B, a valve contact surface 2325*a* brought into contact with the housing 231 when the movable valve 2325 blocks the orifice 2320 and a placement surface 2329*a* of the rotating shaft 2328 of the bearing portion 2329 are disposed in parallel to the gravity direction. As a result, a malfunction of the movable valve 2325 caused by settlement, adhesion of a solid part such as pigment components and the like contained in the ink at the orifice 2320 or a gap between the movable valve 2325 and the orifice 2320 can be suppressed. At this time, the closer to parallel with respect to the gravity direction the valve contact surface 2325*a* or the placement surface 2329*a* of the rotating shaft 2328 is, the more the settlement, adhesion of the ink can be suppressed. Moreover, by opening a through hole at a part of the placement surface 2329*a*, a configuration to cause the ink settled in the bearing portion 2329 to flow outside the bearing portion 2329 may be provided. Moreover, in this Embodiment, if the ink is ink containing titanium oxide, the effect of suppressing settlement, adhesion of the ink by the negative-pressure control unit 230 can be obtained more greatly. However, the ink used for this Embodiment may be various types of ink, not limited to the ink containing titanium oxide.

In FIG. 11, the springs 2326, 2330, which are urging members, are configured as two coupled springs. However, since there is no problem with the pressure adjustment function of the negative-pressure control unit 230, as long as a resultant spring force satisfies a desired negative pressure value, it may be so configured that either one of the two springs 2326, 2330 is used. Moreover, the orifice 2320 is opened so that, by causing the ink to flow in the direction orthogonal to the gravity direction, the ink is caused to flow into the fluid chamber 2323. As shown in FIG. 11, the orifice 2320 is opened in the wall surface 2350 extending along the first direction D1 intersecting with the gravity direction in the wall surfaces forming the fluid chamber 2323. Note that, within a range capable of avoiding adhesion of the ink in the orifice 2320, the direction in which the ink flows into the orifice 2320 may have an angle with respect to the direction orthogonal to the gravity direction, that is, the direction intersecting with the gravity direction.

Figure 14:
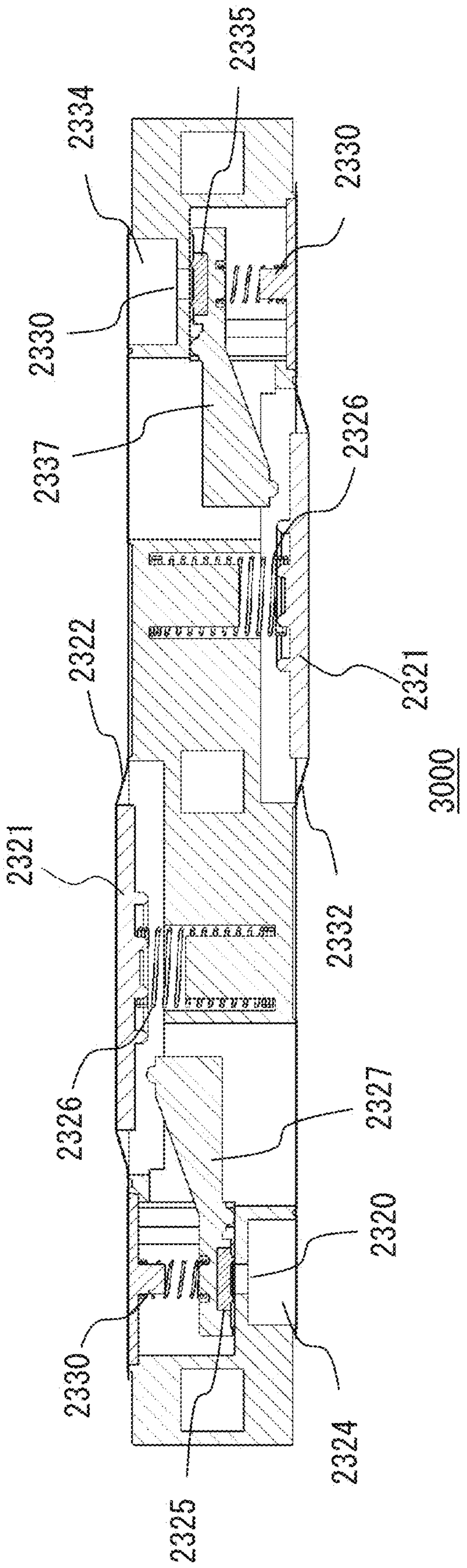
FIG. 14 is a schematic diagram illustrating a section of a negative-pressure control unit according to a variation.

Subsequently, a variation of the negative-pressure control unit according to the aforementioned Embodiment will be explained. Note that, in the following explanation, configurations similar to the configuration in the aforementioned Embodiment are given the same reference numerals, and detailed explanation will be omitted. FIG. 14 illustrates a section corresponding to FIGS. 11 and 12 of a negative-pressure control unit 3000 according to a first variation. As shown in FIG. 14, in a state where the liquid discharge head 3 is attached to the recording device 1000, the negative-pressure control unit 3000 has such a configuration that a plurality of (two in the case of the drawing) the aforementioned negative-pressure control units 230*a* are coupled in the direction orthogonal to the gravity direction.

The negative-pressure control unit 3000 shown in FIG. 14 has two negative-pressure control units 240, 250. The negative-pressure control units 240, 250 have the same configuration as that of the negative-pressure control unit 230*a* shown in FIGS. 11 and 12. Moreover, the negative-pressure control units 240, 250 are coupled in such a manner that they are vertically inverted with respect to each other on the section shown in FIG. 14. In the negative-pressure control unit 3000, in each of the negative-pressure control units 240, 250, it may be so configured that the pressures of ink in different colors are controlled. Alternatively, in the negative-pressure control unit 3000, it may be so configured that the negative-pressure control units 240, 250 are controlled to different negative pressures, respectively, for the ink in the same color. Note that, the operation of each of the negative-pressure control units 240, 250 is similar to that of the aforementioned negative-pressure control unit 230*a* and thus, detailed explanation will be omitted here.

Moreover, in FIG. 14, the negative-pressure control unit 240 and the negative-pressure control unit 250 are coupled in such a manner that the configuration of the section shown in FIG. 14 is vertically inverted with respect to each other, but the negative-pressure control units 240, 250 may be configured to be vertically matched.

Figure 15:
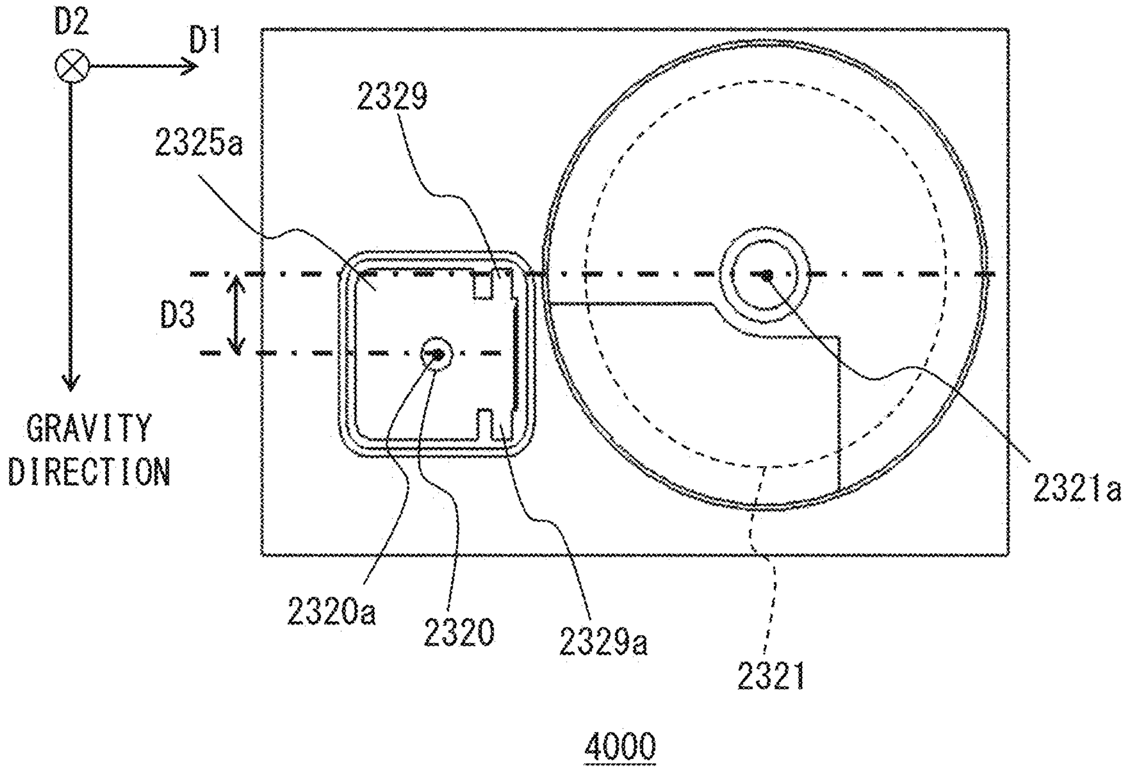
FIG. 15 is a schematic diagram illustrating a negative-pressure control unit according to a variation.

Subsequently, a negative-pressure control unit according to a second variation will be explained. FIG. 15 illustrates a section corresponding to FIG. 10B of a negative-pressure control unit 4000 according to the second variation. Note that, in FIG. 15, the pressure-receiving plate 2321 of the negative-pressure control unit 4000 is also illustrated. Moreover, FIG. 15 illustrates the negative-pressure control unit 4000 in a state where the liquid discharge head 3 is attached to the recording device 1000. Each constituent element of the negative-pressure control unit 4000 is the same as each constituent element of the aforementioned negative-pressure control unit 230. In a state where the liquid discharge head 3 is attached to the recording device 1000, the pressure-receiving plate 2321 of the negative-pressure control unit 4000 is displaced in a direction orthogonal to the gravity direction. Moreover, in accordance with the displacement of the pressure-receiving plate 2321, the lever 2327 is rotated in a plane orthogonal to the gravity direction. Moreover, the orifice 2320 is opened so that, by causing the ink to flow in the direction orthogonal to the gravity direction, the ink is caused to flow into the fluid chamber 2323.

At this time, as shown in FIG. 15, on a plan view by a plane parallel to the gravity direction, that is, when the negative-pressure control unit 4000 is viewed in the second direction D2, an opening center 2320*a* of the orifice 2320 is located below in the gravity direction of a center 2321*a* of the pressure-receiving plate 2321. By configuring the orifice 2320 and the pressure-receiving plate 2321 as above, even if air bubbles are mixed in the ink, the air bubbles hardly remain in the orifice 2320, and the malfunction of the movable valve 2325 caused by the adhesion of the ink at a gas-liquid interface is reduced. Note that, a separation distance D3 between the opening center 2320*a* of the orifice 2320 and the center 2321*a* of the pressure-receiving plate 2321 can be changed as appropriate depending on a material of the ink in use, contents of the pressure control of the ink by the negative-pressure control unit 4000 or the like.

Subsequently, a negative-pressure control unit according to a third variation will be explained. In the aforementioned Embodiments and variations, it may be so configured that the liquid discharge head 3 has a plurality of the recording element boards, and the negative-pressure control unit executes the pressure control of the ink as above for these recording element boards. In this case, the common supply flow-passage 211 connected to the negative-pressure control unit 230 is connected to the plurality of recording element boards having a nozzle row 13*a* constituted by the discharge port 13. By providing the plurality of recording element boards in the liquid discharge head 3, the number of discharge ports (nozzle rows) discharging the ink is also increased and thus, the fluctuation in the ink amount supplied to the discharge port also becomes larger by the density of the print to the recording media or the like. In the pressure control of the ink executed in accordance with the fluctuation in the ink supply amount which becomes larger by the increase in the number of recording element boards of the liquid discharge head 3, by using the aforementioned pressure control unit, the inflow control of the ink by the movable valve according to the fluctuation of the ink in the fluid chamber can be executed appropriately.

According to the art of this disclosure, adhesion of the liquid at the inflow port of the liquid or malfunction of the valve body of the pressure control unit is reduced, whereby the image quality of the recording media to which the liquid is discharged can be maintained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-114629, filed on Jul. 12, 2023, which is hereby incorporated by reference herein in its entirety.

What is claimed is:

1. A liquid discharge unit comprising:

a discharge port which discharges liquid;

a supply path which supplies the liquid to the discharge port; and a pressure control unit which controls a pressure of the liquid supplied from a liquid supply source to the supply path, wherein the pressure control unit comprises:

a fluid chamber having an inflow port into which the liquid from the liquid supply source flows and an outflow port which causes the liquid having flowed in through the inflow port to flow out to the supply path;

a valve body configured to be capable of taking a closed position where the inflow port is closed and an open position where the inflow port is opened;

a movable member configured to be capable of taking a first position acting on the valve body such that the valve body is located at the closed position and a second position acting on the valve body such that the valve body is located at the open position in the fluid chamber; and an urging member which applies an urging force to the movable member for causing the movable member to be located at the first position, the movable member moves from the first position to the second position when a magnitude of a pressure in the fluid chamber becomes greater than the urging force of the urging member, in a state where the liquid discharge unit is attached to a liquid discharge device which discharges the liquid to recording media by using the liquid discharge unit, a direction in which the liquid flows into the inflow port is a direction intersecting with a gravity direction, the inflow port is opened in a wall surface extending along a first direction intersecting with the gravity direction in wall surfaces forming the fluid chamber, the valve body has an annular projection brought into contact with and surrounding the inflow port with respect to the wall surface, when the valve body is at the closed position, a direction in which the urging force of the urging member acts is a second direction intersecting with the gravity direction and is orthogonal to the first direction, the first direction and the second direction are directions orthogonal to the gravity direction, the pressure control unit further comprises a power transmitting member provided capable of rotational movement around a rotation axis orthogonal to both the first direction and the second direction and having one end capable of being brought into contact with the movable member and the other end coupled with the valve body, the movable member is brought into contact with the one end when moving from the first position to the second position by pressure in the fluid chamber against the urging force, and the power transmitting member moves the valve body from the closed position to the open position by rotationally moving in accordance with displacement of the movable member brought into contact with the one end.

2. The liquid discharge unit according to claim 1, wherein the movable member is displaced in the second direction between the first position and the second position.

3. The liquid discharge unit according to claim 1, wherein when viewed in the second direction, an opening center of the inflow port is located below the center of the movable member in the gravity direction.

4. The liquid discharge unit according to claim 1, wherein the liquid is ink containing titanium oxide.

5. The liquid discharge unit according to claim 1, wherein the supply path is connected to a plurality of recording element boards having a nozzle row constituted by plural discharge ports.

6. The liquid discharge unit according to claim 1, wherein two pressure control units are coupled such that a direction in which the liquid flows into the inflow port of each is the same direction.

7. The liquid discharge unit according to claim 1, wherein two pressure control units are coupled such that a direction in which the liquid flows into the inflow port of each is opposite to each other.

8. The liquid discharge unit according to claim 1, wherein the urging member is a first spring, and the movable member is urged in a direction separated from the power transmitting member by the first spring, the power transmitting member is urged by a second spring in a direction in which the valve body is located at the closed position, and the first spring constant is determined by the following equation (1):

$$(k_d x_d + P_2 S_d) * L_1 = (-k_v x_v + (P_1 - P_2) * S_v) * L_2 \tag{1}$$

where, on a plane on which the power transmitting member is rotationally moved, $L_1$: Length obtained by suspending vertically downward from a fulcrum of the power transmitting member in rotational movement to a line of action of force with which the movable member presses the power transmitting member $L_2$: Length obtained by suspending vertically downward from the fulcrum to a line of action of force pressing a center of the valve body $P_1$: Pressure by ink on an upstream side of the inflow port $P_2$: Pressure by ink in the fluid chamber $k_d$: Spring constant of the first spring $x_d$: Spring displacement of the first spring $k_v$: Spring constant of the second spring $x_v$: Spring displacement of the second spring $S_d$: Pressure-receiving area from ink of the movable body $S_v$: Pressure-receiving area from ink of the valve body.

9. The liquid discharge unit according to claim 1, wherein the second position of the movable member is fluctuated in accordance with a pressure in the fluid chamber.

* * * * *